(12) United States Patent
Severns et al.

(10) Patent No.: US 6,898,951 B2
(45) Date of Patent: May 31, 2005

(54) WASHING APPARATUS

(75) Inventors: John Cort Severns, West Chester, OH (US); Frederick Anthony Hartman, Cincinnati, OH (US); James Charles Theophile Roger Burckett-St. Laurent, Cincinnati, OH (US); Anna Vadimovna Noyes, Hamilton, OH (US); Arseni V. Radomyselski, Hamilton, OH (US); Paul Amaat France, West Chester, OH (US); Jeffrey John Scheibel, Loveland, OH (US); Christiaan Arthur Jacques Kamiel Thoen, West Chester, OH (US); John Christopher Deak, West Chester, OH (US); Phillip Kyle Vinson, Fairfield, OH (US); Nabil Yaqub Sakkab, Cincinnati, OH (US)

(73) Assignee: Procter & Gamble Company, Cincinnati, OH (US)

( * ) Notice: Subject to any disclaimer, the term of this patent is extended or adjusted under 35 U.S.C. 154(b) by 99 days.

(21) Appl. No.: 10/738,551

(22) Filed: Dec. 17, 2003

(65) Prior Publication Data

US 2004/0129032 A1 Jul. 8, 2004

Related U.S. Application Data

(63) Continuation of application No. 09/849,893, filed on May 4, 2001, now Pat. No. 6,691,536.
(60) Provisional application No. 60/209,468, filed on Jun. 5, 2000.

(51) Int. Cl.$^7$ ............................................. D06B 23/24
(52) U.S. Cl. ..................... 68/5 C; 68/17 R; 68/18 R; 8/159

(58) Field of Search ........................... 134/122 R, 199, 134/122 P, 54 P; 101/74; 68/94, 97

(56) References Cited

U.S. PATENT DOCUMENTS

| | | | |
|---|---|---|---|
| 1,940,549 A | 12/1933 | Jones |
| 1,948,879 A | 2/1934 | Green |
| 1,990,691 A | 2/1935 | Hatfield |
| 2,037,566 A | 4/1936 | Emmerling et al. |
| 2,200,144 A | 5/1940 | Zimarik |
| 2,243,325 A | 5/1941 | Windell |
| 2,276,681 A | 3/1942 | Allison |

(Continued)

FOREIGN PATENT DOCUMENTS

| | | |
|---|---|---|
| CA | 1 239 326 | 7/1988 |
| DE | 2108 991 | 8/1972 |
| DE | 32 16 151 | * 12/1982 |
| DE | 4131589 A1 | 5/1986 |

(Continued)

OTHER PUBLICATIONS

US 6,001,133, 12/1999, DeYoung et al. (withdrawn)
Trilo et al: "Critical Micelle Density for the Self–Assembly of Block Copolymer Surfactants in Supercritical Carbon Dioxide"; pp. 416–421.
Sarbu et al: "Non–Flurous Polymers With Very High Solubility in Supercritical CO2 Down to Low Pressures"; pp. 165–168.

*Primary Examiner*—Frankie L. Stinson
(74) *Attorney, Agent, or Firm*—Caroline Wei-Berk; Kim W. Zerby; Steve W. Miller

(57) ABSTRACT

The present invention relates to an apparatus for treating, refreshing or cleaning fabric articles, especially articles of clothing, linen and drapery.

23 Claims, 10 Drawing Sheets

U.S. PATENT DOCUMENTS

| | | | |
|---|---|---|---|
| 2,529,802 A | | 11/1950 | Glass |
| 2,875,602 A | | 3/1959 | Galinski |
| 3,086,379 A | | 4/1963 | Plante |
| 3,113,445 A | | 12/1963 | Williams et al. |
| 3,156,647 A | | 11/1964 | Gould |
| 3,384,445 A | | 5/1968 | Gilbert |
| 3,388,410 A | | 6/1968 | Marshall |
| 3,401,052 A | | 9/1968 | Berger et al. |
| 3,473,175 A | | 10/1969 | Sieber |
| 3,635,667 A | | 1/1972 | Keay et al. |
| 3,663,160 A | | 5/1972 | Stone et al. |
| 3,854,871 A | | 12/1974 | Eanzel et al. |
| 4,074,984 A | | 2/1978 | Furhing |
| 4,077,770 A | | 3/1978 | Rouvellat et al. |
| 4,097,397 A | | 6/1978 | Mizutani et al. |
| 4,102,824 A | | 7/1978 | Mizutani et al. |
| 4,111,034 A | | 9/1978 | Hubner |
| 4,137,044 A | | 1/1979 | Flower et al. |
| 4,207,072 A | | 6/1980 | Schuierer et al. |
| 4,267,077 A | | 5/1981 | Niimi et al. |
| 4,336,024 A | | 6/1982 | Denissenko et al. |
| 4,432,111 A | | 2/1984 | Hoffman et al. |
| 4,559,150 A | | 12/1985 | Becker et al. |
| 4,687,121 A | * | 8/1987 | Copeland, James L. ...... 222/64 |
| 4,708,807 A | | 11/1987 | Kemerer |
| 4,761,896 A | | 8/1988 | Miyata |
| 4,909,962 A | | 3/1990 | Clark |
| 4,919,839 A | | 4/1990 | Durbut et al. |
| 5,037,485 A | | 8/1991 | Chromecek et al. |
| 5,046,337 A | | 9/1991 | Ro et al. |
| 5,057,240 A | | 10/1991 | Madore et al. |
| 5,112,358 A | | 5/1992 | Deal, III |
| 5,116,426 A | | 5/1992 | Asano et al. |
| 5,222,267 A | | 6/1993 | Fierro |
| 5,271,775 A | | 12/1993 | Asano et al. |
| 5,302,313 A | | 4/1994 | Asano et al. |
| 5,309,587 A | | 5/1994 | Fierro |
| 5,360,571 A | | 11/1994 | Kilgour et al. |
| 5,412,958 A | * | 5/1995 | Iliff et al. ...................... 68/5 C |
| 5,443,747 A | | 8/1995 | Inada et al. |
| 5,461,887 A | | 10/1995 | VonPless |
| 5,503,681 A | | 4/1996 | Inada et al. |
| 5,503,778 A | | 4/1996 | Liu et al. |
| 5,509,431 A | * | 4/1996 | Smith et al. ................ 134/95.1 |
| 5,520,827 A | | 5/1996 | Danner |
| 5,593,507 A | | 1/1997 | Inada et al. |
| 5,597,792 A | | 1/1997 | Klier et al. |
| 5,628,833 A | | 5/1997 | McCormack et al. |
| 5,676,705 A | | 10/1997 | Jureller et al. |
| 5,683,473 A | | 11/1997 | Jureller et al. |
| 5,683,977 A | | 11/1997 | Jureller et al. |
| 5,690,750 A | | 11/1997 | Inada et al. |
| 5,705,562 A | | 1/1998 | Hill |
| 5,707,613 A | | 1/1998 | Hill |
| 5,716,456 A | | 2/1998 | Inada et al. |
| 5,722,781 A | | 3/1998 | Yamaguchi |
| 5,741,365 A | | 4/1998 | Inada et al. |
| 5,758,377 A | | 6/1998 | Cimetta et al. |
| 5,769,962 A | | 6/1998 | Inada et al. |
| 5,783,092 A | | 7/1998 | Brown et al. |
| 5,802,884 A | | 9/1998 | Cavalli |
| 5,811,383 A | | 9/1998 | Klier et al. |
| 5,858,022 A | | 1/1999 | Romack et al. |
| 5,865,852 A | | 2/1999 | Berndt |
| 5,866,005 A | | 2/1999 | DeSimone et al. |
| 5,876,510 A | | 3/1999 | Kuemin et al. |
| 5,877,133 A | | 3/1999 | Good |
| 5,888,250 A | | 3/1999 | Hayday et al. |
| 5,904,737 A | * | 5/1999 | Preston et al. ................ 8/158 |
| 5,916,336 A | | 6/1999 | Middleton |
| 5,929,012 A | | 7/1999 | Del Duca et al. |
| 5,931,971 A | | 8/1999 | Zucker |
| 5,942,007 A | | 8/1999 | Berndt et al. |
| 5,943,721 A | * | 8/1999 | Lerette et al. ................. 8/158 |
| 5,944,996 A | | 8/1999 | DeSimone et al. |
| 5,954,869 A | | 9/1999 | Elfersy et al. |
| 5,977,040 A | | 11/1999 | Inada et al. |
| 5,977,045 A | | 11/1999 | Murphy |
| 5,985,810 A | | 11/1999 | Inada et al. |
| 6,013,683 A | | 1/2000 | Hill et al. |
| 6,042,617 A | | 3/2000 | Berndt |
| 6,042,618 A | | 3/2000 | Berndt et al. |
| 6,056,789 A | | 5/2000 | Berndt et al. |
| 6,059,845 A | | 5/2000 | Berndt et al. |
| 6,060,546 A | | 5/2000 | Powell et al. |
| 6,063,135 A | | 5/2000 | Berndt et al. |
| 6,086,635 A | | 7/2000 | Berndt et al. |
| 6,098,430 A | * | 8/2000 | McClain et al. ............ 68/18 R |
| 6,114,295 A | | 9/2000 | Murphy |
| 6,114,296 A | | 9/2000 | Schulein et al. |
| 6,136,766 A | | 10/2000 | Inada et al. |
| 6,148,644 A | | 11/2000 | Jureller et al. |
| 6,156,074 A | | 12/2000 | Hayday et al. |
| 6,177,399 B1 | | 1/2001 | Mei et al. |
| 6,200,352 B1 | | 3/2001 | Romack et al. |
| 6,200,393 B1 | | 3/2001 | Romack et al. |
| 6,200,943 B1 | | 3/2001 | Romack et al. |
| 6,204,233 B1 | | 3/2001 | Smith et al. |
| 6,228,826 B1 | | 5/2001 | DeYoung et al. |
| 6,242,408 B1 | | 6/2001 | Elms et al. |
| 6,297,206 B2 | * | 10/2001 | Romack et al. ............. 510/285 |
| 6,310,029 B1 | | 10/2001 | Kilgour et al. |
| 6,312,528 B1 | * | 11/2001 | Summerfield et al. ........ 134/40 |
| 6,313,079 B1 | | 11/2001 | Murphy et al. |
| 6,314,601 B1 | * | 11/2001 | McClain et al. ................ 8/158 |
| 6,368,359 B1 | | 4/2002 | Perry et al. |
| 6,384,005 B1 | | 5/2002 | Woo et al. |
| 6,412,312 B1 | * | 7/2002 | McClain et al. ............ 68/18 C |
| 6,451,066 B2 | * | 9/2002 | Estes et al. .................... 8/142 |

FOREIGN PATENT DOCUMENTS

| | | |
|---|---|---|
| DE | 3739711 A | 6/1989 |
| DE | 296 00 628 U1 | 6/1997 |
| DE | 198 10907 A1 | 9/1999 |
| EP | 1 451 600 A | 10/1976 |
| EP | 0 091 261 A2 | 10/1983 |
| EP | 0 118 625 A2 | 9/1984 |
| EP | 0182583 A2 | 5/1986 |
| EP | 0410 068 A1 | 1/1991 |
| EP | 0 422 787 A2 | 4/1991 |
| EP | 0 566 240 A1 | 10/1993 |
| EP | 0 679 754 A2 | 11/1995 |
| EP | 0 716 870 A1 | 6/1996 |
| EP | 0 479 146 B1 | 12/1996 |
| EP | 0 767 267 A1 | 4/1997 |
| EP | 0 962519 A1 | 12/1999 |
| EP | 1 041 189 A1 | 10/2000 |
| EP | 1 092 803 A1 | 4/2001 |
| FR | 2 268 898 A1 | 11/1975 |
| GB | 1 509 315 | 5/1978 |
| GB | 2 084 204 A | 4/1982 |
| GB | 2 230 022 A | 10/1990 |
| GB | XP 002180809 | 1/1992 |
| GB | 2 251 867 A | 7/1992 |
| GB | XP 002180808 | 11/1992 |
| GB | XP 002180810 | 2/1993 |
| GB | XP 00218007 | 11/1996 |
| JP | 1098-798 | 5/1986 |
| JP | 61-293500 | 12/1986 |
| JP | 3046-300 A | 2/1988 |
| JP | 2166-198 A | 6/1990 |

| | | |
|---|---|---|
| JP | 2202-599 A | 8/1990 |
| JP | 2222-496 A | 9/1990 |
| JP | 04323299 A | 11/1992 |
| JP | 05051598 A | 3/1993 |
| JP | 05239766 A | 9/1993 |
| JP | 7-68082 * | 3/1995 |
| JP | 1188-595 A | 7/1995 |
| JP | 08073837 A | 3/1996 |
| JP | 9143497 A | 6/1997 |
| JP | 10-017891 | 1/1998 |
| JP | 3063-799 A | 3/1998 |
| JP | 11-092784 | 4/1999 |
| JP | 11-323381 | 11/1999 |
| JP | 11-323383 | 11/1999 |
| JP | 00144175 A | 5/2000 |
| JP | 2000-192085 | 7/2000 |
| JP | 00200689 A | 10/2000 |
| WO | WO 82/02218 A1 | 7/1982 |
| WO | WO 94/01227 A1 | 1/1994 |
| WO | WO 96/30471 A2 | 10/1996 |
| WO | WO 97/35061 A1 | 9/1997 |
| WO | WO 98/07405 A1 | 2/1998 |
| WO | WO 98/16615 A1 | 4/1998 |
| WO | WO 99/57358 | 11/1999 |
| WO | WO 00/94221 | 1/2000 |
| WO | WO 00/04222 | 10/2000 |
| WO | WO 01/06051 | 1/2001 |
| WO | WO 01/34613 A1 | 5/2001 |
| WO | WO 01/34706 A1 | 5/2001 |
| WO | WO 01/40567 A1 | 6/2001 |
| WO | WO 01/48297 A1 | 7/2001 |

* cited by examiner

WASHING APPARATUS

RELATED APPLICATIONS

This application is a continuation of prior U.S. application Ser. No. 09/849,893, filed on May 4, 2001 now U.S. Pat. No. 6,691,536; which claims priority under 35 USC 119(e) to U.S. Provisional Application Ser. No. 60/209,468 filed on Jun. 5, 2000.

FIELD OF THE INVENTION

The present invention relates to an apparatus for treating, refreshing or cleaning fabric articles, especially articles of clothing, linen and drapery.

BACKGROUND

For the cleaning of fabric articles consumers have the choice of conventional aqueous immersive wash laundry cleaning or dry cleaning.

Conventional laundry cleaning is carried out with relatively large amounts of water, typically in a washing machine at the consumer's home, or in a dedicated place such as a coin laundry. Although washing machines and laundry detergents have become quite sophisticated, the conventional laundry process still exposes the fabric articles to a risk of dye transfer and shrinkage. A significant portion of fabric articles used by consumers are not suitable for cleaning in such a conventional laundry process. Even fabric articles that are considered "washing machine safe" frequently come out of the laundry process badly wrinkled and require ironing.

Most dry cleaning processes rely on non-aqueous solvents for cleaning. By avoiding water these processes minimize the risk of shrinkage and wrinkling. The need for handling and recovering large amounts of solvents make these dry cleaning processes unsuitable for use in the consumer's home. The need for dedicated dry cleaning operations makes this form of cleaning inconvenient and expensive for the consumer.

More recently, dry cleaning processes have been developed which make use of compressed gases, such as supercritical carbon dioxide, as a dry cleaning medium. Unfortunately these processes have many shortcomings, for example they require very high pressure equipment.

Other drycleaning processes have recently been described which make use of nonsolvents such as perfluorobutylamine. These also have multiple disadvantages, for example the nonsolvent fluid cannot adequately dissolve body soils and is extremely expensive.

Accordingly there are unmet needs for new apparatus, methods, and compositions for cleaning or treating fabric articles that are safe for a wide range of fabric articles, minimize shrinkage and wrinkling, and can be adapted to a cost effective use in the consumer's home and/or in service businesses and commercial environments.

SUMMARY OF THE INVENTION

The needs described above are fulfilled by the present invention.

In one aspect of the present invention, a fabric treating apparatus comprising a chamber capable of receiving a fabric to be treated and a cleaning fluid comprising a lipophilic fluid, wherein when a fabric to be treated is present in the chamber and a cleaning fluid comprising a lipophilic fluid is introduced into the fabric-containing chamber, the fabric-containing chamber retains an amount of lipophilic fluid up to the absorptive capacity of the fabric contained therein, is provided.

In another aspect of the present invention, a kit of consumables, especially suitable for use with the fabric treating apparatus of the present invention, is provided.

These and other aspects, features and advantages will become apparent to those of ordinary skill in the art from a reading of the following detailed description and the appended claims. All percentages, ratios and proportions herein are by weight, unless otherwise specified. All temperatures are in degrees Celsius (° C.) unless otherwise specified. All measurements are in SI units unless otherwise specified. All documents cited are in relevant part, incorporated herein by reference.

BRIEF DESCRIPTION OF THE DRAWINGS

While the specification concludes with claims particularly pointing out and distinctly claiming the present invention, it is believed the present invention will be better understood from the following description in which:

Figure 1:
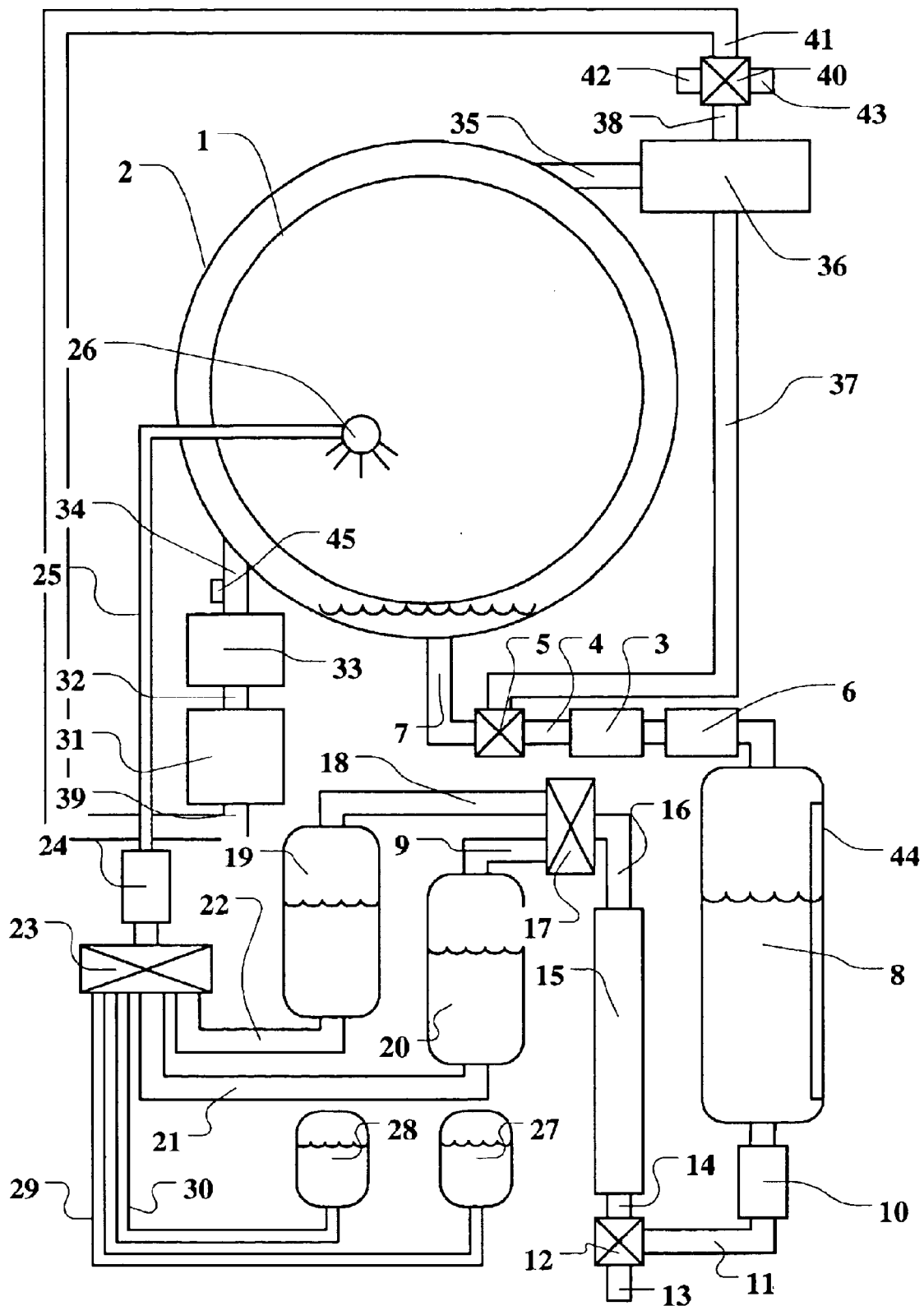
FIG. 1 is a schematic view of an apparatus in accordance with one embodiment of this invention.

It should be understood that the drawings are not necessarily to scale and that the embodiments are some times illustrated by graphic symbols, phantom lines, diagrammatic representations and fragmentary views. In certain instances, details which are not necessary for an understanding of the present invention or which render other details difficult to understand may have been omitted. It should be understood, of course, that the invention is not limited to the particular embodiments illustrated herein.

DETAILED DESCRIPTION OF THE INVENTION

Definitions

The term "fabric article" used herein is intended to mean any article that is customarily cleaned in a conventional laundry process or in a dry cleaning process. As such the term encompasses articles of clothing, linen and drapery, clothing accessories, and floor coverings. The term also encompasses other items made in whole or in part of fabric, such as tote bags, furniture covers, tarpaulins and the like.

The term "lipophilic fluid" used herein is intended to mean any non-aqueous solvent capable of removing sebum, as described in more detail hereinbelow. "Lipophilic fluid" as defined herein generally does not include materials such as compressible gases, such as carbon dioxide or the like. The present lipophilic fluids are at least partially liquid at ambient temperature and pressure.

The term "textile treatment liquid" used herein is intended to mean any liquid, aqueous or non-aqueous, suitable for cleaning, conditioning or sizing of fabrics. "Textile treatment liquid" refers to a liquid other than the lipophilic fluid which is optionally used with the lipophilic fluid.

The phrase "dry weight of a fabric article" as used herein means the weight of a fabric article that has no intentionally added fluid weight.

The phrase "absorption capacity of a fabric article" as used herein means the maximum quantity of fluid that can be taken in and retained by a fabric article in its pores and interstices. Absorption capacity of a fabric article is measured in accordance with the following Test Protocol for Measuring Absorption Capacity of a Fabric Article.

Test Protocol for Measuring the Absorption Capacity of a Fabric Article

Step 1: Rinse and dry a reservoir or other container into which a lipophilic fluid will be added. The reservoir is cleaned to free it from all extraneous matter, particularly soaps, detergents and wetting agents.

Step 2: Weigh a "dry" fabric article to be tested to obtain the "dry" fabric article's weight.

Step 3: Pour 2 L of a lipophilic fluid at ~20 C. into the reservoir.

Step 4: Place fabric article from Step 2 into the lipophilic fluid-containing reservoir.

Step 5: Agitate the fabric article within the reservoir to ensure no air pockets are left inside the fabric article and it is thoroughly wetted with the lipophilic fluid.

Step 6: Remove the fabric article from the lipophilic fluid-containing reservoir.

Step 7: Unfold the fabric article, if necessary, so that there is no contact between same or opposite fabric article surfaces.

Step 8: Let the fabric article from Step 7 drip until the drop frequency does not exceed 1 drop/sec.

Step 9: Weigh the "wet" fabric article from Step 8 to obtain the "wet" fabric article's weight.

Step 10: Calculate the amount of lipophilic fluid absorbed for the fabric article using the equation below.

$$FA=(W-D)/D*100$$

where:
FA=fluid absorbed, % (i.e., the absorption capacity of the fabric article in terms of % by dry weight of the fabric article)
W=wet specimen weight, g
D=initial specimen weight, g By the term "non-immersive" it is meant that essentially all of the fluid is in intimate contact with the fabric articles. There is at most minimal amounts of "free" wash liquor. It is unlike an "immersive" process where the washing fluid is a bath in which the fabric articles are either submerged, as in a conventional vertical axis washing machine, or plunged into, as in a conventional horizontal washing machine. The term "non-immersive" is defined in greater detail according to the following Test Protocol for Non-Immersive Processes. A process in which a fabric article is contacted by a fluid is a non-immerisive process when the following Test Protocol is satisfied.

Test Protocol for Non-Immersive Processes

Step 1: Determine absorption capacity of a fabric specimen using Test Protocol for Measuring Absorption Capacity of a Fabric Article, described above.

Step 2: Subject a fabric article to a fluid contacting process such that a quantity of the fluid contacts the fabric article.

Step 3: Place a dry fabric specimen from Step 1 in proximity to the fabric article of Step 2 and move/agitate/tumble the fabric article and fabric specimen such that fluid transfer from the fabric article to the fabric specimen takes place (the fabric article and fabric specimen must achieve the same saturation level).

Step 4: Weigh the fabric specimen from Step 3.

Step 5: Calculate the fluid absorbed by the fabric specimen using the following equation:

$$FA=(W-D)/D*100$$

where:
FA=fluid absorbed, %
W=wet specimen weight, g
D=initial specimen weight, g Step 6: Compare the fluid absorbed by the fabric specimen with the absorption capacity of the fabric specimen. The process is non-immersive if the fluid absorbed by the fabric specimen is less than about 0.8 of the absorption capacity of the fabric specimen.

The lipophilic fluid alone or with the optional textile treatment liquid and/or any adjunct ingredients, described hereinafter, will be referred to generically as the "lipophilic cleaning fluid", although it should be understood that the term encompasses uses other than cleaning, such as conditioning and sizing. The lipophilic cleaning fluid comprises at least about 50% by weight of the lipophilic cleaning fluid of lipophilic fluid. The remainder of the lipophilic cleaning fluid, that is from about 0% to no more than 50% by weight of lipophilic cleaning fluid, comprises any other fluid such as, textile treatment liquid, and/or an adjunct ingredient, described hereinafter in more detail. Preferably, the lipophilic cleaning fluid contains less than about 30% by weight of water, e.g., less than about 10% by weight. In the figures the term "lipophilic cleaning fluid" will be referred to as LCF.

In the present appliance and process, it is not recommended to clean or treat fabric articles which are soaking wet. However, most fabric articles contain varying amounts of water absorbed from the air or from contact with the wearer. Such articles as well as the occasional water wet article, e.g., swimwear, can be treated in the present appliance and process. In defining the fluids supra, the water content of fabric articles, which can vary, is not included in the accounting of water content.

Apparatus

Disclosed in FIG. 1 is a schematic illustration of particularly preferred apparatus for carrying out a non-immersive laundering process in accordance with the present invention. FIG. 1 discloses a preferred embodiment of an appliance (fabric treating apparatus), more preferably a non-immersive laundering machine, 70, of the present invention. For purposes of clarity, none of the details of the cabinet nor the access door is shown in FIG. 1.

Figure 2:
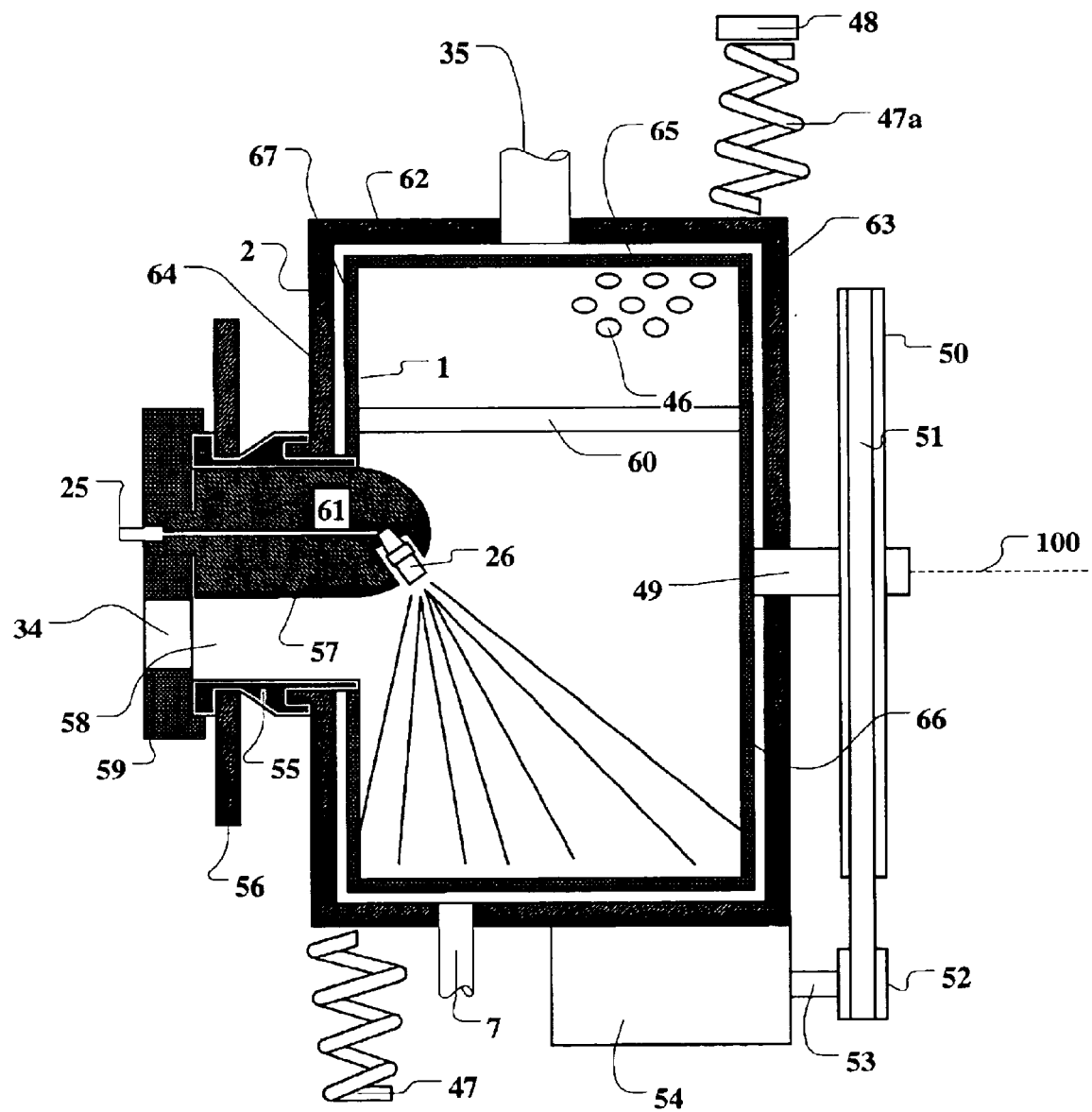
FIG. 2 is a cut away side view of an apparatus in accordance with one embodiment of this invention.

In the embodiment of FIG. 1, the non-immersive laundering machine 70 comprises a chamber 1 capable of receiving a fabric to be treated and a cleaning fluid comprising a lipophilic fluid, wherein when a fabric to be treated is present in the chamber and a cleaning fluid comprising a lipophilic fluid is introduced into the fabric-containing chamber, the fabric-containing chamber retains an amount of the lipophilic fluid up to the absorptive capacity of the fabric contained therein. Preferably, the chamber 1 is a lipophilic fluid pervious chamber. The apparatus 70, preferably further comprises an outer chamber 2 capable of receiving the lipophilic fluid from the fabric-containing chamber that is not retained in said fabric-containing chamber. The outer chamber 2 preferably houses the chamber 1. The outer chamber 2 preferably comprises an exit port or drain 7 through which the lipophilic fluid received by the outer chamber 2 exits the outer chamber 2. It is desirable that the exit of the lipophilic fluid from the outer chamber 2 is at a rate such that the amount of lipophilic fluid in the fabric-containing chamber 1 does not exceed the absorptive capacity of the fabrics contained within the fabric-containing chamber 1. The chamber 1 and the outer chamber 2 preferably are of cylindrical construction and have a horizontal access opening 58, as shown in FIG. 2. The horizontal center line of the outer chamber, which is preferably stationary with respect to the chamber 1 coincides with the axis of rotation 100 of the movable chamber 1 movably mounted within the outer chamber 2. The chamber 1 can in general have any suitable pattern of perforations or openings and is designed consistently with design principles for maximizing fluid flow through its perforated surface without weakening it to an unacceptable extent. The chamber 1 is preferably designed to remain fully rigid when rotated at a high speed in the presence of a load of lipophilic fluid-containing fabric articles. Chamber 1 may contain strengthening elements, such as struts, not shown, and has a back face not visible in FIG. 1, which is typically flat, and may be perforated or non perforated. As will be evident from the disclosures following, the appliance is configured to preferentially direct lipophilic fluid toward the lipophilic fluid-pervious surfaces of chamber 1, rather than toward the back face of the chamber 1.

As is more clearly illustrated in the cross-sectional views of FIG. 2, outer chamber 2 comprises a peripheral wall 62, a back wall 63 secured to one edge of the peripheral wall, a front wall 64 secured to the opposite edge of the peripheral wall, said front wall having a tubular-shaped extension 55 having an access opening 58 used to load and unload laundry from the non-immersive laundry machine 70. This flexible tubular-shaped extension 55 connecting the stationary drum 2 minimizes transmission of vibrations which occur during operation of the machine. Access opening 58, forms a gas seal with front door 59 which is secured about its outermost periphery to the front wall 56 of the washing machine cabinet. Front door 59 optionally includes additional means for assuring a good seal, such as rubber, synthetic rubber, or elastomeric sealing material formed into any suitable shape for assuring the seal. When the fabric treating apparatus 70 is in operation, the apparatus's access door 59 is in the closed position shown in FIG. 2 and forms a "gas-tight" seal against the outermost portion of flexible tubular-shaped extension 55. The quality of the seal is preferably sufficient to permit overpressures or reduced pressures in the appliance, but need not be of the quality required for extreme pressure, e.g., supercritical carbon dioxide operation. These latter elements are illustrated only in the cross-section of FIG. 2 to ensure maximum clarity in the remaining drawing figures.

As can be seen in FIG. 2, outer chamber 2 is preferably supported by means of four suspension springs 47 (only two of which are shown) which are connected at one end to the uppermost portion of the outer chamber 2 and at their other end are secured to the fabric treating apparatus cabinet. The top spring 47a is connected to a load sensor 48 interfaced with controller. In variations of the appliance not shown, any desirable high-speed suspension, load balancing or stabilizer system, for example of types known or disclosed for modern European front-loader washing machines, can be adapted for use in the present apparatus.

Chamber 1 preferably comprises a lipophilic fluid-pervious, e.g., perforated peripheral wall 65, a back wall, preferably substantially imperforate, 66 secured to said peripheral wall and a front wall, preferably substantially imperforate, 67, secured to the opposite edge thereof, said front wall 67 having a tubular-shaped extension 55 having an access opening 58 used to load and unload laundry from the fabric treating apparatus 70; preferably which is concentrically aligned with the access opening 58 in outer chamber 2. Equally spaced on the inner circumference of peripheral wall 65 are three lifting vanes 60, preferably of substantially triangular cross-section. In a particularly preferred embodiment, each of the vanes is symmetrically-shaped about a radially extending line originating at the axis of rotation 100 of chamber 1 and passing through its altitude. This permits rotation of chamber 1 in opposite directions with equal lifting effect on the articles being laundered. It should be understood and appreciated that most conventional laundering machines do not have lifting vanes, while tumble-dryers have lifting vanes designed for low-speed and/or unidirectional "tumbling" operation. Further, the chamber 1 may comprise baffles or other structures a long its interior surface to aid in repositioning the fabrics contained therein.

In an exemplary embodiment of a fabric treating apparatus 70 of the present invention, the chamber 1 measures approximately 21" (53 cm) in diameter by 11" (27.9 cm) in depth, while the triangular-shaped lifting vanes 60 exhibit a base of approximately 2" (5.1 cm.) in width by 9" (22.9 cm.) in depth, an overall altitude of approximately 3" (7.6 cm.) and a land area measuring approximately 1" (2.5 cm.) in width by 7" (17.8 cm.) in depth. The chamber 1 exhibits approximately 750 uniformly spaced perforations 46, each perforation having diameter of about ¼". The outer chamber 2 enclosing the aforementioned movable drum 1 measures approximately 24" in diameter.

Chamber 1 is preferably rotatably secured to outer chamber 2 by means of drive shaft 49. Power to rotate chamber 1 is transmitted by means of a concentrically mounted driven pulley 50. The drive system comprises a variable speed drive motor 54 secured to peripheral wall 62 of outer chamber 2. Any movement of outer chamber 2 does not affect the speed of rotation of chamber 1. The output shaft 53 of drive motor 54 has a secured drive pulley 52. Pulley 52 is connected to pulley 50 by means of conventional drive belt 51. A possible alternative drive system, not shown in the figures, has instead of a single drive pulley 52, two drive pulleys, one eccentrically mounted and one concentrically mounted. In this alternative drive system power to rotate chamber 1 is transmitted to the external portion of drive shaft 49 either by means of an eccentrically mounted driven pulley or by means of a concentrically mounted driven pulley which are both secured in fixed relation to drive shaft.

The eccentrically mounted driven pulley would be used to vary the speed of rotation of the chamber 1 throughout each revolution of the drum, while the concentrically mounted driven pulley would be used to drive the chamber 1 at a constant speed of rotation throughout each revolution.

Interconversions of rotation speed and G-force of any particular drum can be calculated using the following formula $$v = \frac{2\pi r}{t}$$

$$a_c = v^2/r$$

$$F_g = a_c/g$$

Where r is the radius of the drum;

t is the time in minutes of one revolution;

v is the velocity of rotation;

$a_c$ is the centripetal acceleration;

g is 9.8 m/s$^{-2}$ (acceleration of earth's gravity); and $F_g$ is the G force.

For example a drum with a radius of 10.5" would need to be rotated at 40 revolutions per minute (rpm) to generate a force of 0.5 G. Rotating the same drum at 55 rpm would generate a force of 0.9 G. These illustrative examples have no particular significance other than to illustrate the calculation, do not relate to any critical ranges of operation (these are given elsewhere herein) and cannot be construed as limiting of the scope of the present invention.

Preferably, the chamber 1 rotates at more than one speed with respect to the outer chamber 2. More preferably, in one embodiment, chamber 1 rotates at a speed of from about 0.5 G to about 3 G, most preferably from about 0.7 G to about 3 G.

In another embodiment, chamber 1 preferably rotates at a speed of from about 50 G to about 450 G, more preferably from about 150 G to about 450 G.

In a particularly preferred embodiment of the present invention, drive motor 54 is not only variable speed, but is also reversible so that chamber 1 may be rotated first in one direction and then in the opposite direction during specific portions of the laundering cycle. Reversing the direction of drum rotation several times during stages of fluid application/removal provide more uniform agitation and more uniform heat transfer to the fabric articles being treated, and hence more effective removal of soil and/or lipophilic fluid.

At least one of large storage tanks 19 and 20 will contain the lipophilic cleaning fluid. The other large storage tank may also contain the lipophilic cleaning fluid or it may contain another fluid, such as, an optional finishing fluid, described hereinafter in more detail, or it may contain one or more adjunct ingredients, described hereinafter in more detail, which are intended to be combined with the lipophilic cleaning fluid at some point, eg., prior to application on fabric articles present in the apparatus 70 during the cleaning process. More generally adjunct ingredients can be applied to fabric articles at any time. These adjunct ingredients may be in any readily dispensable or flowable form, such as, thixotropic gel, shear thinning liquid, liquid, gel, powder, granule, paste, flake, micropaticles, nanopaticles, suspensions, etc. In another embodiment, both of large storage tanks 19 and 20 will contain the lipophilic cleaning fluid. In another embodiment the adjunct ingredients, described hereinafter in more detail, may also be present in one or both of large storage tanks 19 and 20 in addition to the lipophilic cleaning fluid. This can eliminate the need for any mixing prior to delivery of the contents of the tank to the chamber 1 via the applicator 26, preferably a spray nozzle. Alternatively, the lipophilic cleaning fluid from the large storage tanks 19 and 20, optionally containing in addition the adjunct ingredients, may be mixed with further adjunct ingredients which are stored in small storage tanks 27 and 28. These small storage tanks 27 and 28, preferably contain one or more adjunct ingredients which are intended to be combined with the lipophilic cleaning fluid, e.g., prior to application on to the discrete fabric load present in the apparatus 70 during the cleaning process. These adjunct ingredients, like those possibly stored in large storage tanks 19 and 20, may be in any readily dispensable or flowable form, such as, thixotropic gel, shear thinning liquid, liquid, gel, powder, granule, paste, flakes, suspension, microparticles, nanoparticles, etc. Alternatively, one or more of the small storage tanks 27 and 28 may also contain the lipophilic cleaning fluid, optionally containing one or more adjunct ingredients or it may contain another fluid, such as, a rinse or an optional finishing fluid, described hereinafter in more detail.

For the convenience of a consumer or an operator, both the large tanks 19 and 20, and the small tanks 27 and 28 may optionally be detachable from the apparatus 70. The tank may then be recycled, or can be refilled and reattached to the apparatus. Various known "quick-connect" devices, not shown in the Figures, are known in the art and may be employed to assure quick or convenient release or connection of the tanks. In a preferred embodiment, each tank comprises a physical configuration such that it is attachable and detachable from the apparatus 70 in a "lock and key" manner. In other words, a tank in accordance with the present invention fits selectively into an intended "receiving port" or receptacle of the apparatus of the present invention. This "lock and key" system is preferred when a tank comprises a consumable, such as a detergent composition or a fabric finishing composition. However, such "lock and key" system is suitable for any ingredient intended for use in the apparatus of the present invention. Alternatively, the tanks may be replaceable or disposable, for example as a replaceable cartridge. In one suitable mode of operation, the large tanks are recyclable, permanently fixed in the appliance, or removable only by a trained servicer, while adjunct tanks are consumer-replaceable cartridges which are sold individually or as part of a kit. In more detail, in one mode, once the contents of the tanks are consumed, the empty tanks are removed and replaced with identical tanks containing the desired fluid and/or adjunct ingredients or tanks differing in the benefit agent they contain, so as to provide different benefits, e.g., cleaning benefits, antistatic benefits, home waterproofing, etc. In this case the tanks could be either disposed of by the consumer or returned for refilling by a third party, such as, a retailer, wholesaler, or a manufacturer, with the requisite amount of the desired fluid and/or adjunct ingredients. Alternatively, only one of the large tanks 19 and 20 might be detachable, with the other tank permanently attached to the apparatus 70. Similarly, another possible alternative is that only one of the small tanks 27 and 28 is be detachable, with the other tank permanently attached to the apparatus 70. The detachable tanks could be supplied to the consumer as part of a cartridge kit, optionally including usage instructions, e.g., instructions for the removal of the spent tanks, and the installation of the new tanks containing an amount of the desired fluid and/or adjunct ingredients. The number of tanks, both large and small, can be varied depending on the benefits desired. Any large or small tank permanently affixed to the apparatus will have means for their refilling with the desired fluid and/or adjunct ingredients, such as a re-sealable lid.

The desired fluid and/or adjunct ingredients are delivered into the applicator 26 preferably by pumping with pump 24. The fluid and/or adjunct ingredients stored in the large storage tanks 19 and 20 are pumped from through lines 22 and 21 respectively, first passing through valve 23, then through pump 24, then finally through line 25 to spray nozzle 26. The fluid and/or adjunct ingredients stored in the small storage tanks 27 and 28 are pumped from through lines 29 and 30 respectively, first passing through valve 23, then through pump 24, then finally through line 25 to spray nozzle 26. The priming of pump 24 is improved by placing both large tanks 19 and 20 and small tanks 27 and 28, above pump 24 to enable gravity feeding of fluid and/or adjunct ingredients through lines 21, 22, 29 and 30 respectively. One preferred pump is a gear pump with suitable maximum flow rate 0.5 GPM and suitable maximum pressure 50 psi. A gear pump is preferred because it generally generates higher pressure than any other type of pump and it produces pulseless flow which is desired for a good spraying pattern. Other means of conveying fluids can be used. For example, in one possible embodiment not illustrated in the Figures, lipophilic cleaning fluid could be pushed from large tanks 19 and 20 by overhead pressure created by an air compressor, hence, eliminating the need for pump 24. The air compressor would be connected to each of the large and small tanks by pressure lines. Other means of conveying fluids may include centrifugal, diaphragm, piston, or peristaltic pumps. Similar, alternative delivery of the fluid and/or adjunct ingredients stored in small tanks 27 and 28 are possible.

The fluid and/or adjunct ingredients stored in both the large tanks 19 and 20 and small tanks 27 and 28 are mixed by opening valves in 4-to-1 valve manifold 23 corresponding to lines connected to corresponding tanks containing fluid and/or adjunct ingredients. For example, it is possible to mix lipophilic cleaning fluid stored in large tank 19 with an adjunct ingredient stored in large tank 20 by valve manifold 23. Alternatively, it is possible to mix lipophilic cleaning fluid stored in large tank 19 with an adjunct ingredients stored in small tanks 27 and 28 by valve manifold 23. In another embodiment, fluid and/or adjunct ingredients are delivered separately, i.e. without pre-mixing.

Pump 24 is connected to applicator 26 via line 25 in order to introduce fluids into interior of chamber 1. The applicator 26 may be of any suitable shape, but is preferably shaped to deliver a flat fan spray and/or a conical fan spray. A flat fan spray produces a liquid sheet parallel to the major axis of the orifice. The spray is in the shape of a sector of a circle of about 75° angle, elliptical in cross section. The particular flat fan spray is preferred because it produces droplets which are large enough not to be carried away by circulating air stream resulting from movement of the chamber 1. A preferred droplet size is from about 100 to about 1000 microns. This droplet size is an average size and is measured by either a Malvern particle analyzer or high speed photography. When finer mist is used, e.g., droplets with an average particle size of less than 100 microns, the spray pattern is typically disturbed by air movement in the chamber 1. Higher rotation speed of the chamber 1, typically above 735 $m/s^2$, requires larger droplets in spray pattern. The pressure in the delivery line 25 should be high enough to produce a substantially flat fan-shaped spray of the fluid through the applicator 26 to cover the entire depth of the chamber 1. Suitable pressures in delivery line 25 will vary depending upon what is being passed along the delivery line 25 to the applicator 26. For example, a paste typically requires different pressure to a thixotropic gel, or a liquid. Similarly, lipophilic cleaning fluid which is mixed with a adjunct ingredient may require a different pressure to a lipophilic cleaning fluid without any adjunct ingredients. In any even the present system encompasses all manner of variations including Newtonian and non-Newtonian, shear-thinning and non-shear thinning variations. Further, the present appliance can handle multiphase mixtures, emulsions, microemulsions, and dynamically changing emulsion systems. In an alternative embodiment, not shown, the lipophilic cleaning fluid is delivered via more than one spray nozzle. In this embodiment the location of each spray nozzle is such that the lipophilic cleaning fluid is sprayed from the multiple spray nozzles in a fashion to evenly distribute the fluid on the fabric articles. In another alternative embodiment, also not shown, the apparatus has more than one spray nozzle but one nozzle is for delivering the lipophilic cleaning fluid and the other nozzles are for delivering, for example, finishing fluid, rinse, adjunct ingredients. Such application can occur at any suitable point in an appliance operation sequence and can be sequential with or concurrent with lipophilic cleaning fluid application and/or removal.

Fluids, both those which only contain fluids such as the lipophilic cleaning fluid, or finishing fluid, and those which include one or more adjunct ingredients in addition to the lipophilic cleaning fluid, or finishing fluid, are fed into the applicator 26 by means of pump 24 having a maximum rated capacity of 5 liters per minute at maximum pressure 110 psi (758 kPa) via a ¼" (6 mm) diameter flexible delivery line 25.

In one embodiment of the present invention, it is preferred that pump 24 and valve 23 located below tanks 19, 20, 28, and 27 to provide gravity priming.

FIG. 2 shows the internal configuration of a preferred applicator 26, a spray nozzle. The spray nozzle 26 is shown in FIG. 2 as parallel to the axis of rotation 100 of the chamber 1. In another embodiment the spray nozzle 26 is located on the axis of rotation 100 of the chamber 1. The spray nozzle 26 is supported by a spraying arm 57 secured to the front door 59. The fluids are delivered to the nozzle 26 via conduct 61 connecting fluid delivery line 5 to the nozzle 26. Spray nozzle 26 is located parallel to the axis of rotation 100, so that it directs a flat, fan-shaped spray to strike peripheral wall 65, front wall 67, and back wall 66 of the chamber 1. Spray arm 57 allows spraying onto the front wall of the chamber 1 without any of the garments in the discrete fabric articles been wrapped around the spray arm 57 during tumbling cycle and consequently inhibit or possibly even prevent efficient cleaning of the discrete fabric articles.

An alternative embodiment, not illustrated in the figures, the spray nozzle 26 can be directly secured to flexible tubular-shaped extension 55, eliminating the need for spray arm 57 and conduct 61. Spray nozzle 26 can be directly linked to fluid delivery line 5, which can in turn be linked to delivery line 25. Spray nozzle 26 can be located in a position on the flexible tubular-shaped extension 55 which can allow it to direct a flat, fan-shaped spray to strike peripheral wall 65, front wall 67, and back wall 66 of the chamber 1. Other locations of the spray nozzle 26 are possible, but not illustrated in the figures. However, in at least one mode of the invention, any possible location and/or configuration of the spray nozzle 26 (or a plurality of such nozzles) is preferably such that it (i) directs a flat, fan-shaped spray to strike preferentially at the fluid-pervious peripheral wall 65, and in one mode, preferably to a lesser extent, front wall 67 and back wall 66, of the chamber 1; and (ii) such location and/or configuration of a nozzle or plurality of nozzles is such as to prevent any tendency for any of the garments in the discrete fabric load to become wrapped around the spray arm 57, spray nozzle 26, or any other structure associated with the spray nozzle 26, during an operating cycle, and more particularly, during a tumbling cycle.

The fluid spray nozzle utilized in the illustrated system is rated to deliver 0.5 U.S. gallons per minute (about 1.87 liters per minute) at 40 psi (about 275 kPa) fluid pressure, maximum pressure 100 psi (about 690 kPa), and forms a spray angle of 80°. Other application means, for example, atomizers, nebulizers, etc., may be used, but preferably they will be selected such that they produce a similar distribution of fluids.

In this embodiment of the invention, the extent of accumulation of fluids on the bottom of the outer chamber 2 inside surface is insufficient to form an immersion bath for the fabric articles, and they are removed by pump 3 through valve 5 and line 7. Pump 3 is able to handle lint and particulate matter without clogging and is preferably able to run dry without damage over time. Centrifugal pump is preferred because such pumps have a large moving part (propeller or impeller) which is not easily clogged by undissolved solids and contain no rubbing parts that can be damaged by abrasion. Gear pumps may be used, however centrifugal pumps are preferred. Pump 3 is located below outer chamber 2 for gravity priming. To assure good pumping, no air should be present in line 7, therefore, length of line 7 is preferably minimized to decrease the amount of fluids required to replace air in line 7. When present, the fluid level on the bottom of the outer chamber 2 is below the bottom level of chamber 1 to avoid lifting of fluids by chamber 1.

Fluids removed from the textiles during rotation of the chamber 1 preferably pass through the perforations 46 of chamber 1, and either under force of gravity run down the outer surface of the chamber 1 until they reach the lowest point of the outer surface of the chamber 1 and fall to the very bottom inner surface of the outer drum, or contact the inner surface of the outer chamber 2 and stream down under force of gravity until they reach the very bottom of the inner surface of the outer chamber 2. It is at this lowest point of the inner surface of the outer chamber 2 that line 7 is located. While the chamber 1 is rotating at low speeds, such as, 9.8 m/s$^2$ not much fluids pass from the textiles and flow into line 7 via the outer chamber 2. When rotation is at higher speeds, such as, 735 m/s$^2$, fluid flow into and through line 7 becomes significant. While not being limited by theory, it is believed that this is due to a combination of centrifugal forces on the fluid in the fabric articles and air movement, between chamber 1 and outer chamber 2. Moving air picks up extracted droplets from outer surface of perforations, and circulates fluid droplets while high enough rotation speed is maintained. When rotation speed of the chamber 1 is reduced, force of moving air is not enough to overcome gravity, and droplets fall through drum-cover gap or roll down inside cover surface. The inner surface of the outer chamber's 2 geometry is designed in such a way, so to direct all fluids/droplets into line 7. The outer chamber's 2 geometry can be designed to prevent movement of droplets by air, since the air (or other suitable gas, e.g., nitrogen) stream induces foaming in surfactant-containing fluids. In one possible embodiment, a number of channels are incorporated into the inside surface of the outer chamber 2 to minimize the surface area of fluids in contact with air. The channels direct all the expired fluids into line 7. In another alternative embodiment, the spacing between inner drum 1 and outer drum 2 can be increased to reduce air velocity along inner surface of the outer chamber 2. Moreover, fluids for use in the present inventions may be designed to incorporate suds suppressors, such as capped nonionic surfactants: such suds suppressors can be unexpectedly useful in the operation of the present invention.

Fluids in line 7, as well as those from line 37, described in more detail hereinafter, are then fed into the filter 6 and tank 8 by means of a pump 3 having a maximum rated capacity of 3 gallons per minute and maximum pressure 50 psi (345 kPa). The delivery line 7 preferably has a diameter of ½" (127 mm).

Prior to delivering fluids into recovery tank 8, fluids are filtered in filter 6 after passing 3-way valve 5. In its first position, valve 5 connects lines 4 with 7, allowing fluids to be pumped by pump 3 into tank 8 through filter 6. In its second position i valve 5 allows fluids to be pumped from line 37 to line 4. And in its third position valve 5 is closed. Filter 6 removes lint, fabric fibers and large particulate soil, so they don't settle on the tank 8 bottom and clog downstream lines. Also, filter 6 assures reliable operation of pump 10, since pump 10 is a typically higher pressure pump which generally is of a type more easily damaged by solids. Also, filter 6 will extend lifetime of recovery system 15. Filter 6 may be any conventionally used filter and includes, but is not limited to Fulfo® basket strainers or pleated cartridges such as those manufactured by Parker Filtration, e.g. US mesh 20 to 100 (840 micron to 149 micron filters) cartridge filter. In one embodiment the filter 6 may be periodically removed to facilitate removal of lint, fabric fibers and large particulate soil. In another embodiment the filter 6 can be replaced with a new identical, but unused, filter 6 and the removed filter 6 can be discarded or recycled by a third party for resale and reuse. In another embodiment the filter 6 can be self-cleaning. The removed lint and large particulate soil can either then be disposed of by removal to domestic sewerage or by collection in a separate location where the solid matter may conveniently be disposed of by the consumer.

Recovery tank 8 is used for fluids separation. Moreover, tank 8 is very preferably needed because fluid comes out of the chamber 1 in small amounts and at different flow rates, which is not enough to fill all lines up to tanks 19 and 20 and is difficult to efficiently pump. Hence, a sufficient amount of fluids is very preferably collected in tank 8 before further processing is performed on the fluids therein. Tank 8 is equipped with a fluid level sensor, 44, such as conductive, capacitive or optical sensor, located along the inside wall of the tank 8, at an appropriate location, to determine when to start emptying tank 8. The sensor is connected to the controller described later.

Recovery tank 8 performs gravity separation or any other type of separation to separate different fluids as well as any suspended solids present. These solids will be typically, soil removed from the textiles by the cleaning process. In this case, when using fluids with different densities, they will separate in tank 8 by gravity, and can be removed sequentially. In such case, the bottom fluid would be pumped first by pump 10 through line 11 through 3-way valve 12 and line 14 into recovery system 15 and through line 16. Then, depending on where this particular fluid was originally stored, e.g in tank 19, 2-valve manifold directs the bottom fluid into line 18. After all the bottom fluid has been removed from tank 8, and the phase separation line reached valve 17 that is equipped with a sensor to distinguish fluids, such as conductivity, optical or capacitive sensor, valve 17 closes line 18 and opens line 8 to deliver the top fluid into tank 20.

If needed or desired, the invention can further employ adjuncts specifically designed to assist in emulsion breaking, thereby providing additional assistance to separation operations.

Valve 12 has two positions. In its first position, valve 12 connects lines 11 and 13 allowing to drain contents of tank 8. Line 13 may be a direct line to domestic sewerage or to a stand alone separate fluid container, not shown. In its second position, valve 12 connects line 11 and 14 to direct fluids into recovery system 15.

Pump 10 creates higher pressures, typically 10–100 psi (69 689 kPa) to push dirty fluids through recovery system 15. Recovery system 15 removes fine soil particulate and has means of separating out dissolved non-cleaning fluid components such as soils, surfactants, water etc. by means of fine filtering/separation such as molecular sieve filtration etc. One possible way to remove contaminants from the solvent is by an electrostatic fluid filtration system such as described in U.S. Pat. No. 5,958,205 to Ingalls et. al., issued on Sep. 28, 1999. Other possible ways to remove contaminants are by, for example, membrane evaporation technologies, or the PACE ultrafiltration system as manufactured by Smith and Loveless Inc. In one embodiment the recovery system 15 may be periodically removed to facilitate removal of the collected dissolved non-cleaning fluid components. In another embodiment the recovery system 15 can be replaced with a new, but unused, identical recovery system 15 and the removed recovery system 15 discarded or recycled by a third party for resale and reuse. In another embodiment the recovery system 15 can be self-cleaning. The collected dissolved non-cleaning fluid components can either then be disposed of by removal to domestic sewerage or by collection in a separate location where the collected dissolved non-cleaning fluid components may conveniently be disposed of by the consumer.

In one embodiment fluids are fed into the recovery system 15 by means of a pump 10 having a maximum rated capacity of 2.8 liters per minute at maximum pressure 250 psi (1724 kPa) via a ¼" (6 mm) diameter stainless steel delivery lines 11 and 14.

It is also possible in the recovery system 15 to use means other than fine filtering/separation to separate out dissolved non-cleaning fluid components from the fluid. One exemplary alternative system is one in which the recovery system 15 comprises a distillation system. Suitable distillation systems include the distillation solvent recycling system as described in U.S. Pat. No. 5,876,567 to Yamamoto et. al., issued on Mar. 2, 1999. When the recovery system 15 is a distillation system, pump 10 need not be a higher pressure pump, as higher pressures are typically not required.

It should of course be understood and appreciated that any of the variations herein can be added, removed, or adapted in a manner consistent with the intended use of the appliance. For example, it is significantly more likely that a service or commercial operation will be able to afford an appliance having a distillation or vacuum system, whereas it is more likely that an otherwise simpler or lower cost system modified to include the greatest convenience of operation, e.g., cartridge removal systems for provision of adjuncts, will be most desirable and affordable for use in the home.

Fluid valves 12, 5, 7, and 23 are automatically actuated. This is accomplished utilizing solenoids or ball valve motors similar to drive apparatus well known in the art.

Figure 3:
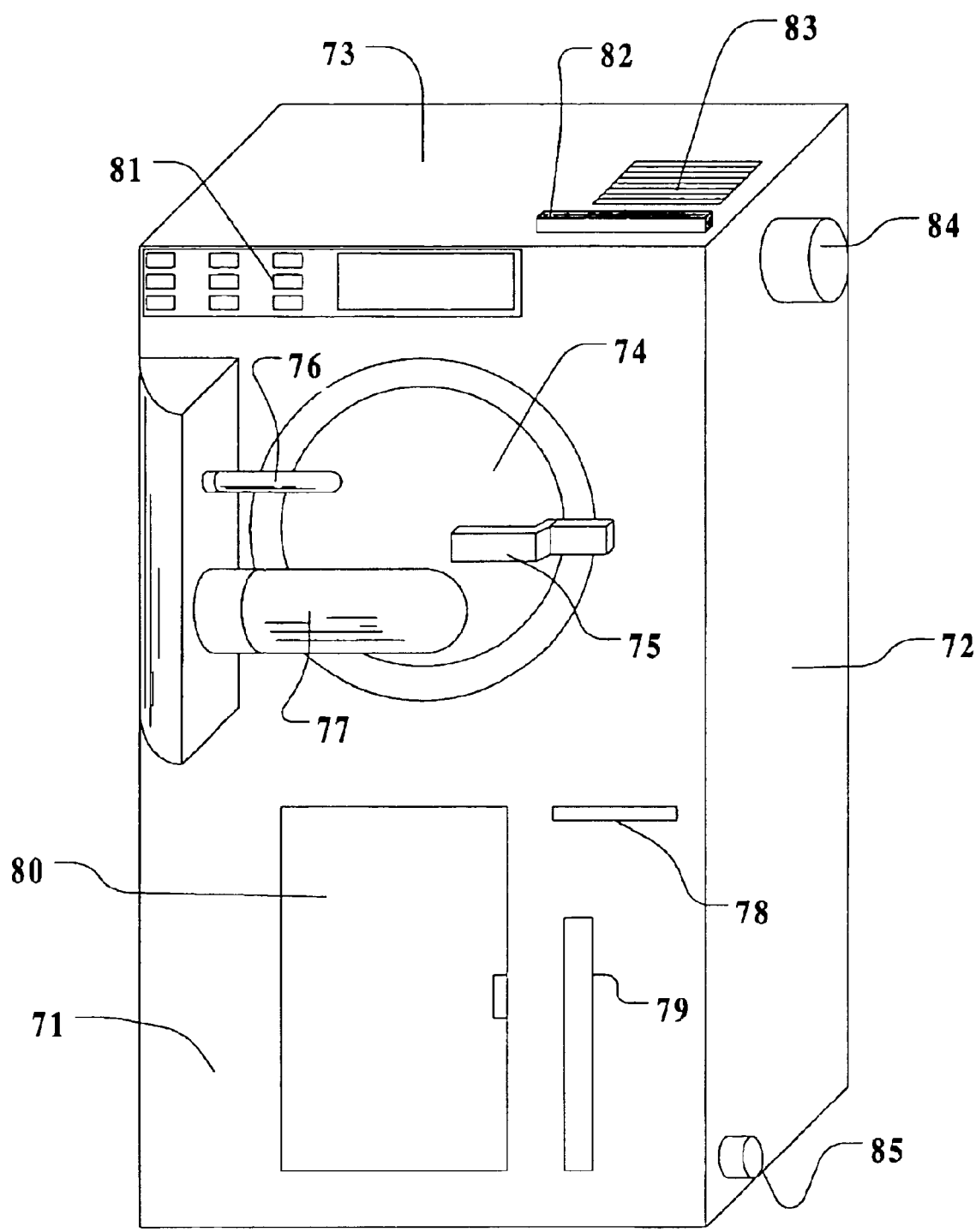
FIG. 3 is a front view of an apparatus in accordance with one embodiment of this invention.

The apparatus 70 illustrated in FIGS. 1-3 can, and preferably does, include an air circulation system. The air circulation system comprises suction blower 31 and air duct 32 connecting the blower to a heater 33. The heater 33, preferably an electric heater, includes a heating element over which the air must pass prior to entering connecting duct 34, which conveys heated air from the heater 33 to an inlet opening located in the door 59 of the apparatus. Alternatively, the air may enter the inner drum by an opening in the rear wall of the outer drum 63 and the rear wall of the inner drum 66. This latter arrangement is typical of those found in conventional tumble-dryers and location of the connecting duct would be readily apparent. Preferred blower 31 is of centrifugal type powered by variable speed drive motor. A suitable heating element is a resistive coil, the temperature of which is adjusted by regulating coil voltage. Alternative heating means may also be used, for example, an infrared radiation source, or a microwave radiation source. In an alternative embodiment, the air can be supplemented with steam. In which case, the use of heated air becomes optional, with the steam providing part or all of the heated gas.

In one alternative embodiment not shown in the figures, the air may be ionized before it contacts the fabric articles, for example by corona discharge.

In one alternative embodiment not shown in the figures, ozone may be added to the air before it contacts the fabric articles. Alternatively, the ozone may be added to the chamber 1 through a system of conduits which is independent of the air circulation system.

In the embodiment disclosed in FIG. 2, heated air is introduced in the interior of the chamber 1 to remove residual fluid from the cleaned articles. The chamber 1 is rotated at varying speed and direction during a drying cycle. Since the articles being dried are normally located at or adjacent the innermost surface of peripheral surface of the chamber 1 during the drying cycle, the heated air introduced in the interior of movable drum is caused to penetrate the textiles being dried on its way to return to opening to a duct 35 located in the stationary drum peripheral surface.

In the apparatus illustrated in FIGS. 1–3, the air circulating blower 31 utilized to recirculate air during drying and vapor treatment cycles has rated capacity 160 cfm (272 m$^3$/hr) and 5500 lfm (27.9 m/s) velocity at the outlet. Typically in a domestic apparatus, ie one designed for home or the like use, would have an air flow rate of from about 15 L/s (35 cfm) to about 272 l/s (160 cfm). Commercial or industrial scale apparatus go up to about 1200 l/s (2542 cfm). The connecting ducts used to construct circulation loop are sized to permit circulation of air at the rated flow. The heater 33 contains a heating element 33 comprising 115 V AC, 2300 watt, spiral wound, nichrome coil. The temperature sensing element 45 comprises a thermistor inserted into duct 34. A voltage regulating rheostat, 0–120 V AC, is utilized to regulate variable speed motor of the blower 31 and temperature of the heating element 33.

In an alternative embodiment, gas, optionally heated, preferably air, nitrogen, ozone, argon, helium, neon, xenon, and mixtures thereof, more preferably air, nitrogen, ozone and mixtures thereof, is introduced in the interior of the inner drum 1 to remove particulate soil from textiles prior to treating with the lipophilic cleaning fluid. The inner drum 1 is rotated at varying speed and direction during this optional pretreatment cycle. In this optional pretreatment stage the gas enters the inner drum 1, while the drum is rotating at a centrifugal acceleration of less than 9 ms$^{-2}$, preferably from about 4.5 ms$^{-2}$ to less than 9 ms$^{-2}$ (i.e., at a speed such that the fabric articles in the inner drum 1 tumble) at a rate of from about 10 l/s to about 70 l/s and the gas enters the inner drum 1 with a velocity of from about 1 m/s to about 155 n/s. More detailed disclosure of apparatus, components, elements and exemplification of this optional pretreatment step can be found in U.S. patent application No. 60/191,965 to Noyes et. al., filed Mar. 24, 2000, incorporated herein by reference.

The duct 35 is connected to a condenser 36. Condenser 36 removes all the vapors and undissolved solids picked up by the heated air from the dried textiles, so that duct 38 contains no other vapors but air. Condenser 36 subjects the moving air to filtering and cooling in order to condense the vapors into a line 37. The vapors condensed in line 37 then pass to the three way valve 5 where mixing occurs with the fluid removed from the outer drum 2 via line 7. A water-cooled condenser or a refrigerated condenser as described in U.S. Pat. Nos. 3,807,948 to Moore issued on Apr. 30, 1974; U.S. Pat. No. 4,086,705 to Wehr issued on May 2, 1978 and U.S. Pat. No. 4,769,921 to Kabakov et. al., issued on Sep. 13, 1988 can suitably be used. The condenser may also be connected with a columnar body of an adsorbent such as a molecular sieve or activated carbon, in one or more layers to collect non-condensed organic solvents. Examples of such absorption devices are described in U.S. Pat. Nos. 3,955,946 to Fuhring et. al., issued on May 11, 1976; U.S. Pat. No. 3,883,325 to Fuhring et. al., issued on May 13, 1975; U.S. Pat. No. 4,440,549 to Girard et. al., issued on Apr. 3, 1984; U.S. Pat. No. 4,583,985 to Preisegger issued on Apr. 22, 1986; U.S. Pat. No. 4,788,776 to Fuhring et. al., issued on Dec. 6, 1988; U.S. Pat. No. 4,622,039 to Merenda issued on Nov. 11, 1986, and U.S. Pat. No. 5,277,716 to Boppart et. al., issued on Jan. 11, 1994. The absorbent can be desorbed by passing a "blanket" of steam through the bed. Other solvent recovery systems are described in U.S. Pat. No. 5,467,539 to Hahn issued on Nov. 21, 1995 and U.S. Pat. No. 5,195,252 to Yamada et. al., issued on Mar. 23, 1993.

In another arrangement, not illustrated in the figures, vapors, e.g., vapors of lipophilic fluid, are prevented from being vented from the appliance by contacting them with an additional filter element or cartridge comprising a catalyst, preferably complemented or supported by a porous material, or alternatively, a filter element or cartridge comprising at least one highly effective chemisorption or physical adsorption agent. Such a system essentially reduces the vapor pressure of the vapor to zero, and can even, for example, polymerize and/or solidify one or more components of the lipophilic fluid. More particularly, for example, a suitable catalytic converter cartridge can include a porous material or support, and a catalyst supported thereon. Such a catalyst can, for example, include any known ring-opening polymerization catalyst for cyclic silicones; these are extensively documented in the literature. See, for example, the very fast phosphazene approach described in Macromol. Rapid Commun. (1995), 16(6), 449–53, or more recently, the phosphazene base catalysts of U.S. Pat. No. 6,054,548 incorporated herein by reference, and J. Inorg. Organomet. Polym. (1999), 9(1), 17–34; it is found that amounts of water present in the present appliance and process are sufficient to activate such hindered amine base catalysts for the present purposes. See also U.S. Pat. No. 6,001,928 which, while failing to teach the porosity of the present support materials, relates to making silicone-filler composites; the learnings therein with respect to catalyst can be reapplied for the quite different purpose of trapping siloxanes in the present context. Alternatively, electron-deficient silane catalysts can be used, see Polym. Prepr. (Am. Chem. Soc., Div. Polym. Chem.) (1996), 37(1), 805–6, as can sulfonium or iodonium derivatives, see Polym. Prepr. (Am. Chem. Soc., Div. Polym. Chem.) (1996), 37(1), 537–8, or for the catalyst tris(4-methylphenyl)sulfonium hexafluoroantimonate, see Polym. Prepr. (Am. Chem. Soc., Div. Polym. Chem.) (1995), 36(2), 267–8. Alternatively, and quite inexpensively, alkali metal silanoates can be used, see Inorg. Chim. Acta (1996), 244(2), 185–90, or more particularly in the case of lithium silanolate, Makromol. Chem., Macromol. Symp. (1993), 73(International Symposium on Ring-Opening Polymerization, 1992), 183–201. It is also known that typical Pt, Rh and Co hydrosilation catalysts also catalyze the ring-opening polymerization of many different types of heterocyclic monomers provided that a SiH-containing cocatalyst is also present, see Macromol. Symp. (1994), 77 (International Symposium on New MacromolecularArchitectures and Supramolecular Polymers, 1993), 413–21. Somewhat older ring-opening polymerization catalysts are reviewed and disclosed in Kompoz. Polim. Mater. (1991), 50, 9–14. Preferred catalysts herein include the fast phosphazenes or any other equivalent hindered base, as well as the Li and K silanolates. Preferred catalysts herein can be modified in any manner, for example by clathration, absorption on the support, etc., such that they have no or very low intrinsic volatility and good stability for the usage lifetime. Preferred supports include those having a high void volume while having low resistance to flow. The supports can be homogeneous or heterogeneous, for example including a primary support material, such as a mesoporous silica, affixed to a mechanical supporting structure, such as a synthetic plastic. It should be understood and appreciated that this aspect of the invention is independently useful and can be used to safely control venting in any application, including immersive and non-immersive processes for cleaning any material, whether a fabric article or a hard surface, especially wherever a linear or cyclic siloxane is part of the solvent system.

The combination of the ring-opening polymerization catalyst and the storage capacity of a high void volume porous material, such as a mesoporous silica, makes it possible to eliminate lipophilic fluid and prevent any venting to the outside atmosphere. The cartridge can be removed periodically, for disposal and replacement with a fresh cartridge, or alternatively for removal of the polymerized lipophilic cleaning fluid, and, optionally, regeneration of the catalyst for reuse.

The apparatus 70 may also remove residual fluid in much the same fashion as a conventional clothes drying apparatus. This is done by actuating the diverter valve 40 into its first position connecting duct 43 to duct 41 and duct 38 to duct 42. In its second position, diverter valve 40 permits fresh air to be drawn into connecting duct 43 through connecting duct 41 and into the inlet of the blower 31, heated to a predetermined temperature by heater 33, circulating through the dried textiles contained in the movable drum 1, cleaned of vapors picked during contact with the textiles, and vented to the atmosphere via duct 42. When the vapors are vented to the atmosphere via duct 42 it is preferable to treat the vapors in some fashion so that only air, water vapor and similar materials, are passed into the atmosphere via duct 42. This can include passing the vapors through a scrubber, or a cartridge which includes a supported catalyst as disclosed supra. The catalyst could include a polymerization catalyst which would polymerize the lipophilic cleaning fluid to produce a solid polymer which would the deposit on the support. The cartridge would allow air, water vapor and similar materials to pass through easily while retaining vapors such as the lipophilic cleaning fluid. The cartridge could be removed periodically, for disposal and replacement with a fresh cartridge, or alternatively for removal of the polymerized lipophilic cleaning fluid, and regeneration of the catalyst for reuse.

In its second position, connecting ducts 43 and 42 are blocked off and all of the vapor-air mixture withdrawn from the stationary drum 1 is returned to the suction side of the blower 31 via connecting duct 41. In this position, the apparatus 70 may also be used for vapor treatment of the textiles by recirculating heated air through the inner drum 1 containing textiles which have been contacted with the lipophilic cleaning fluid.

The temperature of the air is sensed by in connecting duct 34 by means of sensing element 45, which is preferably of a thermistor type, sends a signal to the heater. This ensures continous monitoring of the temperature of heated air, air/ozone, air/vapor or air/ozone/vapor mixture during any cycle and can be maintained at predetermined level or varied, depending on what stage of the cleaning cycle the apparatus 70 is presently in. For example, one temperature may be used for pretreatment, whereas another is used for assisting in removing the lipophilic cleaning fluid.

Diverter valve 40 may be automatically actuated. This may be accomplished utilizing solenoids or similar to drive apparatus well known in the art.

Connecting duct 35 is equipped with a VOC sensor to monitor vapor concentration in air stream exiting the stationary drum 2. VOC sensor transmits signal proportional to vapors concentration to the machine controller. Depending on magnitude of the signal, the controller either continues, stops, or selects a new cycle. VOC sensor is preferably of on a metal oxide type, but other alternative sensors such as infra red, capacitive, or conductive can be used. In a particular embodiment, when at some point in a drying cycle, VOC sensor signal reaches some minimal value that indicates low amounts of vapors present at the exhaust, the controller stops the drying cycle by deactivating heater 33, and continuing with a cooling cycle.

In another embodiment, weight of the fabric articles and the lipophilic cleaning fluid thereon, as well as any adjunct ingredients, is measured from load characteristics of electrical motor 54, such as voltage across motor terminals. In another embodiment, a device system for determining the load of fabric articles and the lipophilic cleaning fluid thereon, as well as any adjunct ingredients, in the chamber 1, includes one capable of determining the moment of inertia of the mass of load of fabric articles and the lipophilic cleaning fluid thereon, as well as any adjunct ingredients, in the chamber 1, from data relating the drive torque of the chamber 1, the friction torque of the chamber 1, the moment of inertia of this chamber and the acceleration of the chamber.

An out-of-balance control for the described apparatus is incorporated via monitoring a current signal which is proportionate to the current drawn by the motor 54. When the chamber 1 is accelerated, the current signal variations reflect torque required to rotate the chamber 1. The magnitude of the variations is proportional to load unbalance which causes excessive vibrations of the machine. When the unbalance signal magnitude exceeds the maximum permissible value, the machine controller executes re-balancing cycle by slowing the rotation, reorganizing the fabric load by tumbling, and accelerating to a set speed again. Alternative means of sensing unbalanced state can be use of a tachometer or a static switch.

The apparatus 70 operates in at least three rotation modes. First mode is tumbling where chamber 1 rotation speed is about 50 rpm, revolutions per minute, that causes laundered articles inside chamber 1 to tumble. That is, in this first mode, the centrifugal acceleration of the inner drum is less than 9 m/s$^2$. Second mode is suitably 1 G mode, where rotation speed is slowly increased to about 100 rpm causing laundered articles to be evenly distributed and slightly pressed against the inside wall of chamber 1. That is, in this second mode, the centrifugal acceleration of the inner drum is equal to or slightly higher than 9.8 m/s$^2$, preferably up to about 30 m/s$^2$. In the third mode, the variable speed motor 54 goes through modes one and two and then accelerates to rotation speed of about 1300 rpm. That is, in this third mode, the centrifugal acceleration of the inner drum is typically up to about 4,450 m/s$^2$. It is to be understood that the rotation speeds are only illustrative of the rotational speeds of an chamber 1 of the size of that illustrated in the figures. The rotational speeds in rpm of chamber 1 smaller or larger in size than that shown in the figures will be such that it will produce the required centrifugal acceleration.

One preferred motor for this embodiment is a brushless motor such as those manufactured by Emerson Electric Co., of St. Louis, Mo. Brushless motors can operate for extended periods of time without excessive heating and sparking. More information on this brushless motors can be found in U.S. Pat. No. 5,532,534 to Baker et. al., issued on Jul. 2, 1996. Brushless permanent magnet motors in operational use offer the best efficiency presently known for electric motors in general use, although switched reluctance motors and controlled induction motors often are configured to achieve substantially equivalent performance. Conventional, motors may be used. However, brushless motors are preferred. A brushless permanent magnet motor is similar to other motor types in that it includes a stator assembly having a core of laminations formed from suitable magnetic material. The core has winding receiving slots formed in it. The rotor assembly commonly is the component that distinguishes a permanent magnet motor from other motors. Unlike other conventional motor constructions, a brushless motor rotor has at least one permanent magnet associated with it. The motor may be either of a conventional design, in which the stator assembly has an axial opening through the core for reception of the rotor assembly, or the motor can be a so-called inside out motor, which has the rotor assembly outboard of the stator. In other variations, the motor can be constructed such that at least a portion of the motor is actually integral with another part of the appliance.

In alternate embodiments, the apparatus of the present invention may optionally be operated at reduced or elevated pressure, typically achieved via a vacuum pump or by supplying a gas, such as nitrogen, to the apparatus thereby increasing the pressure in the washing chamber. Such embodiments can even include modifications of appliances designed for supercritical or dense gas cleaning, however, all the preferred embodiments herein have as a significant advantage that they do not require the very high pressure capabilities or design elements of such dense gas cleaning appliances.

FIG. 3 shows a front view of the apparatus 70, illustrated in FIGS. 1–2. The apparatus 70, has front panel 71, two side panels 72 (only one of which is shown), and top panel 73. Door 59 contains spray nozzle cover 76, which covers line 25, which delivers the fluids to spray head 26; gas cover 77, which covers the 33 which delivers gas to the chamber 1 via connecting duct 34; and handle 75. Door 59 may be made of any suitable material and it is preferred that at least a portion of door 59 be opaque to enable the operator to watch the apparatus in operation.

Also on front panel 71 is the apparatus controller 81. The apparatus controller 81 is the controller responsible for the timing and sequencing of the various process steps involved in using the apparatus. For example, apparatus controller 81 controls the amount of lipophilic cleaning fluid delivered to the fabric articles, and at what speed the drum is spun at, how long are the fabric articles tumbles for etc. The apparatus controller 81 also has provision for the consumer/operator to enter directly relevant information about the fabric articles being cleaned and/or the type of cleaning desired.

Access door 80 is also located on front panel 71. Access door 81 enables the operator/consumer to access the inner workings of the apparatus to remove and replace any consumables, such as filters, fluids, adjuncts etc. Access door 81 more specifically allows access to small tanks 27 and 28 and large tanks 19 and 20, for removal and replacement if they are replaceable or for re-filling. Access door 81 also allows easy access for any needed maintenance or repairs.

Panels 78 and 79 are access ports for the easy removal and cleaning or replacement by the operator/consumer of filters. Panel 79 provides access to the recovery system 15 and panel 79 provides access to filter 6.

Located on the side panel 72 shown in FIG. 3 are fluid outlet 85 and gas outlet 84. Fluid outlet 85 is connected to line 13 and is then connected to the domestic sewerage, another fluid storage container or both. Gas outlet 84 is linked to duct 42. The optional scrubber, baffle or cartridge, referred to previously, may be located between gas outlet 84 and duct 42 or it may be linked to gas out let 84. That is any gas or vapor first passes through duct 42, then gas outlet 84 then to the optional scrubber, baffle or cartridge.

Located on to panel 73 are air inlet 83, which provide an additional source of air to the apparatus via duct 43, and access port 82 which allows for the easy removal and cleaning or replacement by the operator/consumer of any filter associated with the air system 35, 36, 38, and 40–43.

FIGS. 4–8 illustrate various methods and steps involved in the washing of fabrics in accordance with the present invention.

Figure 4:
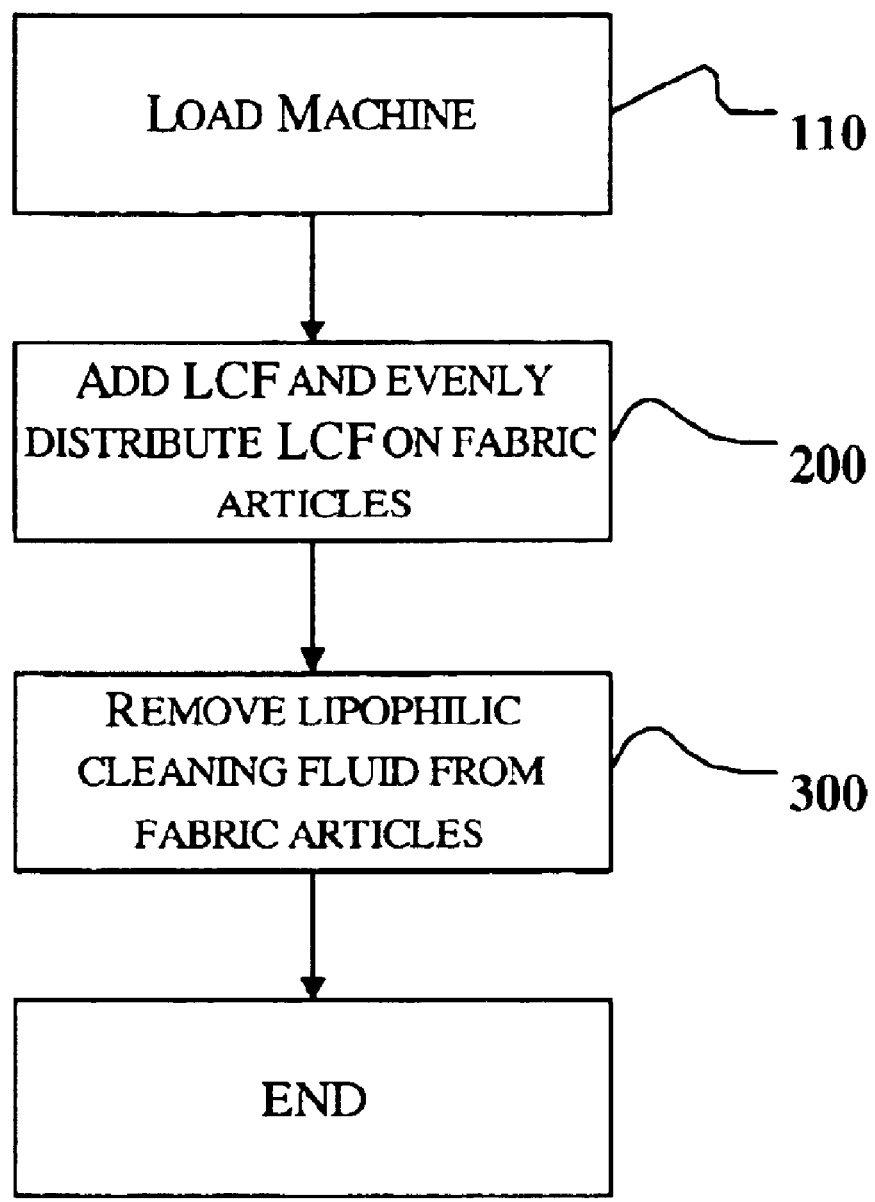
FIG. 4 is a flowchart diagram illustrating a low volume method of cleaning a fabric load in accordance with the present invention.

Turning to FIG. 4, a first step 110 in one method of practicing the present invention is the loading of the chamber 1 in FIGS. 1 and 2. The chamber 1 is capable of tumbling, agitating, rotating, or otherwise applying mechanical energy to the combination of the fabrics and the lipophilic cleaning fluid. A next step 200 includes the even distribution of the lipophilic cleaning fluid on to all the fabric loaded into the chamber 1. One preferred method for applying the lipophilic cleaning fluid involves multiple spin, spray and tumble cycles. This preferred even distribution stage is illustrated in greater detail in FIGS. 9 and 10 and the corresponding description.

In step 200 the amount of lipophilic cleaning fluid which is evenly distributed on the fabric is typically, less than about 5 times the dry weight of the fabric articles to be cleaned, more preferably less than about 2 times the dry weight of the fabric articles, even more preferably less than about 1½ times (i.e., 3/2 times) to about 0.2 times the dry weight of the fabric articles, even more preferably from about 20% to about 150%, more preferably from about 20% to about 90%, by weight of the dry fabric load. This amount of lipophilic cleaning fluid evenly distributed will depend on a wide range of factors, such as, type of fluid, its affinity to fabrics, garment construction, soil load to be removed, etc. For example, typically, fine, thin garments will require lesser amount of lipophilic cleaning fluid than heavier garments. However, the quantity of fluid is such, that there is none or minimal amounts of lipophilic cleaning fluid in excess of absorption capacity of the garments, which is typically about 150%, by weight of the dry fabric. For example, in a single application of lipophilic cleaning fluid to clean a typical 5 kilogram load of assorted soiled fabrics, the apparatus of the present invention can use as little as from about 5 kg to about 10 kg of lipophilic cleaning fluid. (of course fluid reservoirs in the appliance can in general be stocked with much more fluid than is used in a single pass, and the appliance may fully or partially recycle fluid from pass to pass and/or have multiple passes). Typically, in a domestic situation the amount of fluid is based on weight, type of garments, soil amount, and can be controlled by user-selectable interface choosing the most appropriate cycle, much in the same fashion as a consumer would on a conventional washing machine.

In step 200 the time taken for applying the lipophilic cleaning fluid will depend upon the precise method(s) used for applying the lipophilic cleaning fluid and on the number of passes of lipophilic cleaning fluid through the fabric articles and can vary quite widely. For example, this can take from about 30 seconds to about 30 minutes. More generally, a complete cleaning or fabric treatment operation of fabric articles, from start to end (at which time the fabric articles are ready to wear with the exception of optional ironing) can take from about 5 minutes to about three hours, or even longer, for example, if a low-energy overnight mode of operation is contemplated or if a cleaning operation is to be followed by additional fabric treatment. The total processing time will also vary with the precise appliance design, for example appliance variations having reduced pressure (vacuum) means can help reduce cycle time. In the alternative, embodiments involving longer times may be less desirable for the consumer but may be imposed by energy-saving requirements, which can very from country to country. Typical processes include those taking from about 20 minutes to about two hours in total. The balance of process time apart from the various lipophilic cleaning fluid application stages, will typically be dedicated to removal and/or finishing.

The lipophilic cleaning fluid is then removed from the fabrics in step 300. This removal is best described as a non-distillative removal. This is referred to as NDR in FIGS. 5–8. Examples of non-distillative removal include, but are not limited to, an inflatable bladder, not shown in the figures, which expands from the back wall of the inner drum shown at 66 in FIG. 2, along the axis of rotation of the inner drum shown at 100 in FIG. 2. The bladder expands until it fills all the available space of chamber 1 pressing the fabric load against the inner wall of the chamber 1. This expansion forces or helps force the lipophilic cleaning fluid out of the fabric through the perforations in the inner drum shown at 46 in FIG. 2 into the inner surface of the outer chamber 2 in FIG. 2. The removed lipophilic cleaning fluid is then removed from the outer chamber 2 in a manner identical to that described above with reference to FIGS. 1 and 2. During this non-distillative removal the chamber 1 may be stationary, rotating at speed sufficient to tumble the fabrics or rotating at sufficient speed to fix the fabrics in place on the inner wall of the chamber 1. The expansion of the bladder may be performed several times in combination with deflating the bladder and redistributing the fabric load by rotating the chamber 1. Another illustrative non-distillative removal involves the use of capillary action, such as that supplied by a sponge or the like, not shown in the Figures. In this embodiment, after the lipophilic cleaning fluid is evenly distributed on the fabrics and then contacted with a sponge or the like, to remove the lipophilic cleaning fluid. The fluid then removed is passed through the sponge via capillary action to collect on the inner surface of the outer chamber 2. The removed lipophilic cleaning fluid is then removed from the outer chamber 2 in a manner identical to that described above with reference to FIGS. 1 and 2. The sponge may be, for example, located in the rear wall of the inner drum 66, or in one of the lifting vanes shown at 60 in FIG. 2. The sponge would be prevented from contacting the fabric until appropriate by means of a movable cover. Yet another non-distillative removal, involves high speed rotation and is illustrated in greater detail in FIGS. 9 and 10 and the corresponding description.

Figure 5:
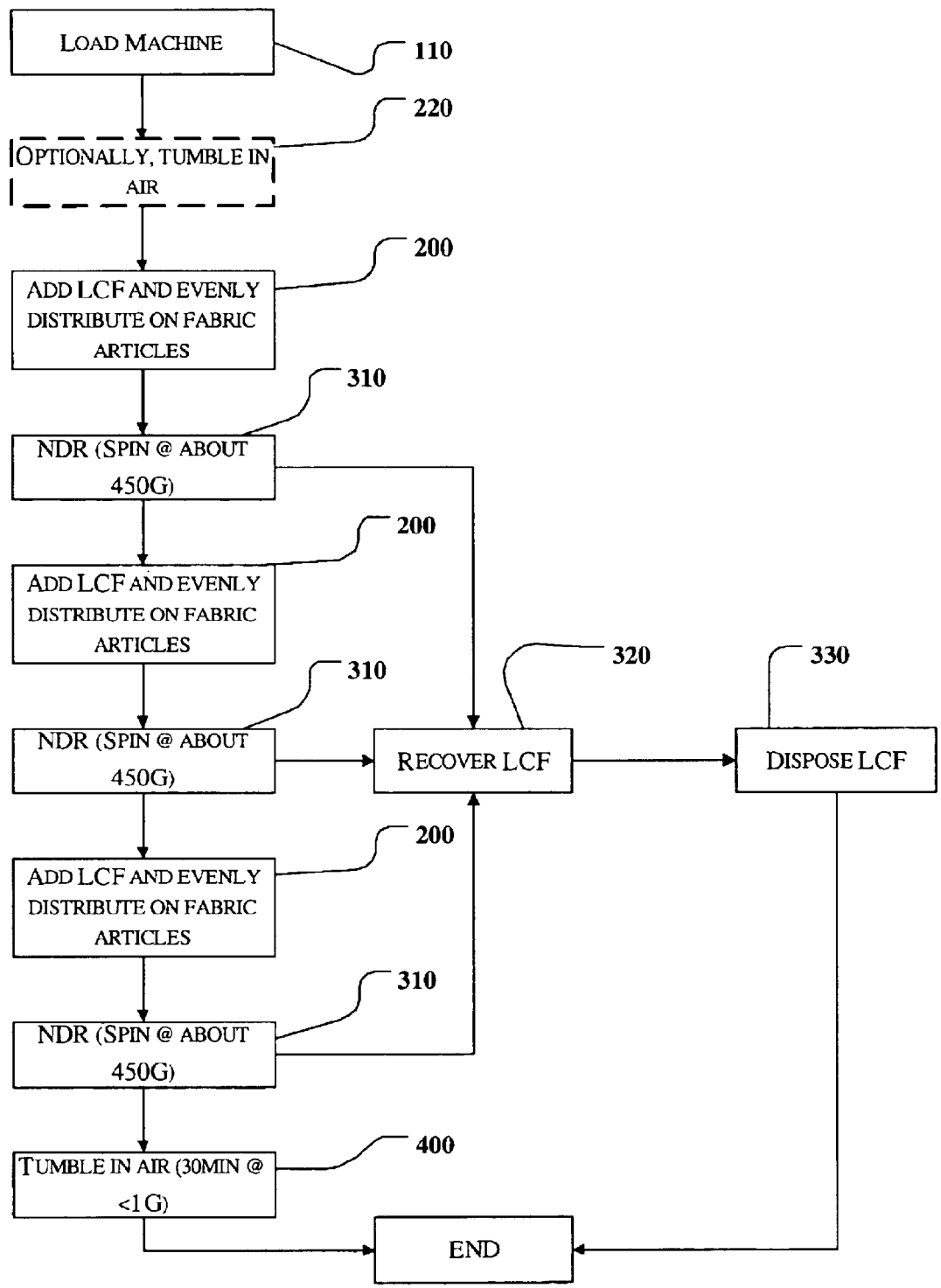
FIG. 5 is a flowchart diagram illustrating another low volume method of cleaning a fabric load in accordance with the present invention.

Another method is illustrated in FIG. 5 which includes multiple applications and removal of the lipophilic cleaning fluid. The method illustrated in FIG. 5 begins with the loading of the apparatus at step 110. After the fabric is loaded, the first step, which is an optional one, is the pre-treatment of the fabric with gas and tumbling at step 220. In the methods illustrated in FIGS. 5–8 the pre-treatment of the fabric articles with gas, 220 is optional, as illustrated by the broken lines in FIGS. 5–8. Step 220 for pre-treating the fabric articles involves tumbling the fabric articles for about 5 to about 10 minutes in gas, which has a muzzle velocity of from about 1 m/s to about 155 m/s and a flow rate of from about 10 l/s to about 70 l/s. This step of tumbling of the fabric articles in gas in one preferred mode of the invention is to at least partially remove particulate soil, such as, cat fur, skin flakes or scales, dander, dandruff, hair from people or pets, grass seeds, pollen, burrs, and/or similar animal, mineral or vegetable matter, though in general, the appliance does not require such a step. In one embodiment of the present invention as gas is selected from the group consisting of air, nitrogen, ozone, oxygen, argon, helium, neon, xenon, and mixtures thereof, more preferably air, nitrogen, ozone, oxygen, argon, helium, and mixtures thereof, even more preferably still air, ozone, nitrogen, and mixtures thereof. When ozone is used, it will of course typically be heavily diluted with air and/or nitrogen such that, for example, from about 1 ppm to about 1000 ppm of ozone is instantaneously present. Ozonization optionally may be conducted when the fabric articles are not in contact with lipophilic fluid, or can be done in the presence of any suitable carrier or ozone transfer fluid, including water or any fluorocarbon, which can be different in composition from the lipophilic fluid. In another aspect of this embodiment of the present invention the gas used in the method can be varied over time. For example air could be used at the start of the process, a mixture of air and ozone used in the middle stages of the process and air or nitrogen could be used at the end. The gas can be introduced continuously or in intervals ("pulsing" sequence) while the fabric articles are tumbled. For example, using an interval method, the fabric articles could be tumbled for 30 seconds, during which the airflow rate is sufficient enough to carry the dislodged particles out, but air velocities are below 1000 ft/min. In the next 30 seconds airflow velocity is increased to the rate of 6000–20000 ft/min, which dislodges more solid soils, and so on. In the most preferred embodiments two types of air flow will exists simultaneously: general directed airflow with flow rate from 40–200 cfm that is employed constantly and second flow rate provided by high velocity nozzles with air velocity of 6000–20000 ft/min that can be either continuous or pulsing. For further exemplification and illustration of this pretreatment step see U.S. Provisional Patent No. 60/191,965 filed Mar. 24, 2000 which is herein incorporated by reference.

The lipophilic cleaning fluid is then evenly applied on to all the fabric articles loaded into the apparatus at step 200.

The lipophilic cleaning fluid may optionally be a combination of lipophilic fluid and adjunct ingredient. The lipophilic cleaning fluid may be a mixture which is distributed over the fabric articles at the same time or they may be added separate sources and distributed over the fabric articles at the same time. Alternatively, the lipophilic fluid and an adjunct ingredient may be added separately in any possible combination, such as, lipophilic fluid then adjunct ingredient or adjunct ingredient then lipophilic fluid, etc. The lipophilic fluid and an adjunct ingredient may be stored separately and mixed prior to application, or stored as a mixture, that is stored together as the lipophilic cleaning fluid. The adjunct ingredient is added to the lipophilic fluid to improve soil removal and/or impart desired properties/finish to the treated fabric articles. Combinations or mixtures of adjunct ingredient are also envisioned.

One preferred method for applying the lipophilic cleaning fluid involves multiple spin, spray and tumble cycles. This preferred even distribution stage is illustrated in greater detail in FIGS. 9 and 10 and the corresponding description. The lipophilic cleaning fluid and any soil on the fabric articles is then removed from the fabric articles by non-distillative removal. In the illustrated method this non-distillative removal involves subjecting the fabric articles to high centrifugal acceleration, typically of the order of about 4,450 m/s$^2$ (about 450 G). Typically, the fabric load is subjected to the high centrifugal acceleration for about 30 seconds to about 5 minutes. The lipophilic cleaning fluid and soil removed by the high centrifugal acceleration is recovered in step 320. This recovery of the mixture of the lipophilic cleaning fluid and soil removed from the fabrics is that the mixtures is collected at a point separate from the fabric articles to prevent the soil from reapplying to the fabric articles. For example, tank 8, and the assorted pumps and delivery lines 3–7 as illustrated in FIG. 1 is one possible way of recovering the fluid removed from the fabric articles. The recovered lipophilic cleaning fluid and soil removed from the fabrics are then disposed in step 330. The recovered lipophilic cleaning fluid and soil may be disposed of in a variety of ways in step 330. For example, but not limited to, both disposed down the sewer, the lipophilic cleaning fluid is separated into lipophilic fluid, soil other fluids and adjuncts, with any of these being disposed down the sewer and the other stored in the apparatus for disposal by the consumer in household waste, or especially in the case of the lipophilic cleaning fluid or lipophilic fluid, removal of the used collected lipophilic fluid for recycling by a third party. However, it is preferred that the lipophilic fluid not be disposed down the sewer. In the even there is no separation of the lipophilic cleaning fluid from the soil, or into it component parts, namely lipophilic fluid optional adjuncts etc., the collected lipophilic cleaning fluid may be for example, disposed down the sewer, stored in the apparatus for disposal by the consumer in household waste, or stored for removal of the used collected lipophilic cleaning fluid for recycling by a third party. However, it is preferred that the lipophilic cleaning fluid not be disposed down the sewer.

For an example of the removal of lipophilic cleaning fluid and soil from the fabrics, chamber 1 which holds the fabric and lipophilic cleaning fluid evenly distributed on the fabric is gradually accelerated to a centrifugal acceleration of greater than about 9.8 m/s$^2$. Rotation of the chamber 1 at this centrifugal acceleration "fixes" or holds the fabric articles to the inner wall of the chamber 1 and prevent them from tumbling. The garments are "fixed" the inner wall of the chamber 1 and do not tumble because the centrifugal acceleration is greater that gravitational acceleration, 9.8 m/s$^2$.

The centrifugal acceleration is then increased to a centrifugal acceleration of typically from about 2000 m/s$^2$ to about 4450 m/s$^2$. This centrifugal acceleration draws the lipophilic cleaning fluid and any soil on the fabric articles through the fabric on to the inner wall of the chamber 1. The centrifugal acceleration the forces this mixture of soil and lipophilic cleaning fluid through the perforations in the inner drum 46 to the inner wall of the outer chamber 2. The removed lipophilic cleaning fluid and soil mixture is then removed from the outer chamber 2 in a manner identical to that described above with reference to FIGS. 1 and 2.

The illustrated process of FIG. 5, unlike that illustrated in FIG. 4, involves three separate steps of even distribution, spinning extraction and recovery of the lipophilic cleaning fluid. The lipophilic cleaning fluid is added and evenly distributed over the fabric articles, step 200, after the optional gas pre-treatment step 220, followed by non-distillative removal, in this case high centrifugal acceleration removal of the lipophilic cleaning fluid and soil from the fabric articles, step 310, and consequential removal, recovery and disposal of lipophilic cleaning fluid and soil, steps 320 and 330. Following the final spin extraction step 310, air is introduced to the fabric at step 400 to complete the drying of the garments without the need for an additional or separate drying apparatus. Typically, the high centrifugal acceleration of step 310 removes at least about 70%, more preferably at least about 80% by weight of the lipophilic cleaning fluid. The removal of the remaining lipophilic cleaning fluid is obtained by step 400. That is, tumbling the fabric articles in moving air. The air is preferably at a temperature of from about 20° C. to about 80° C., and at a flow rate of about 15 l/s to about 272 l/s. Alternatively, a gas such as nitrogen may be used in place of air, or gases such as steam, ozone could be added to the air. Similarly, the air may be optionally, ionized, or perfumes and other surface active and inert substances can be added to the gas stream to obtain additional benefits such as static removal, pleasant odor, disinfection, softening etc. Exhaust air preferably is filtered or cleaned by other means to ensure that minimal solvent amount leaves the system such as, by the exhaust systems illustrated above.

Figure 6:
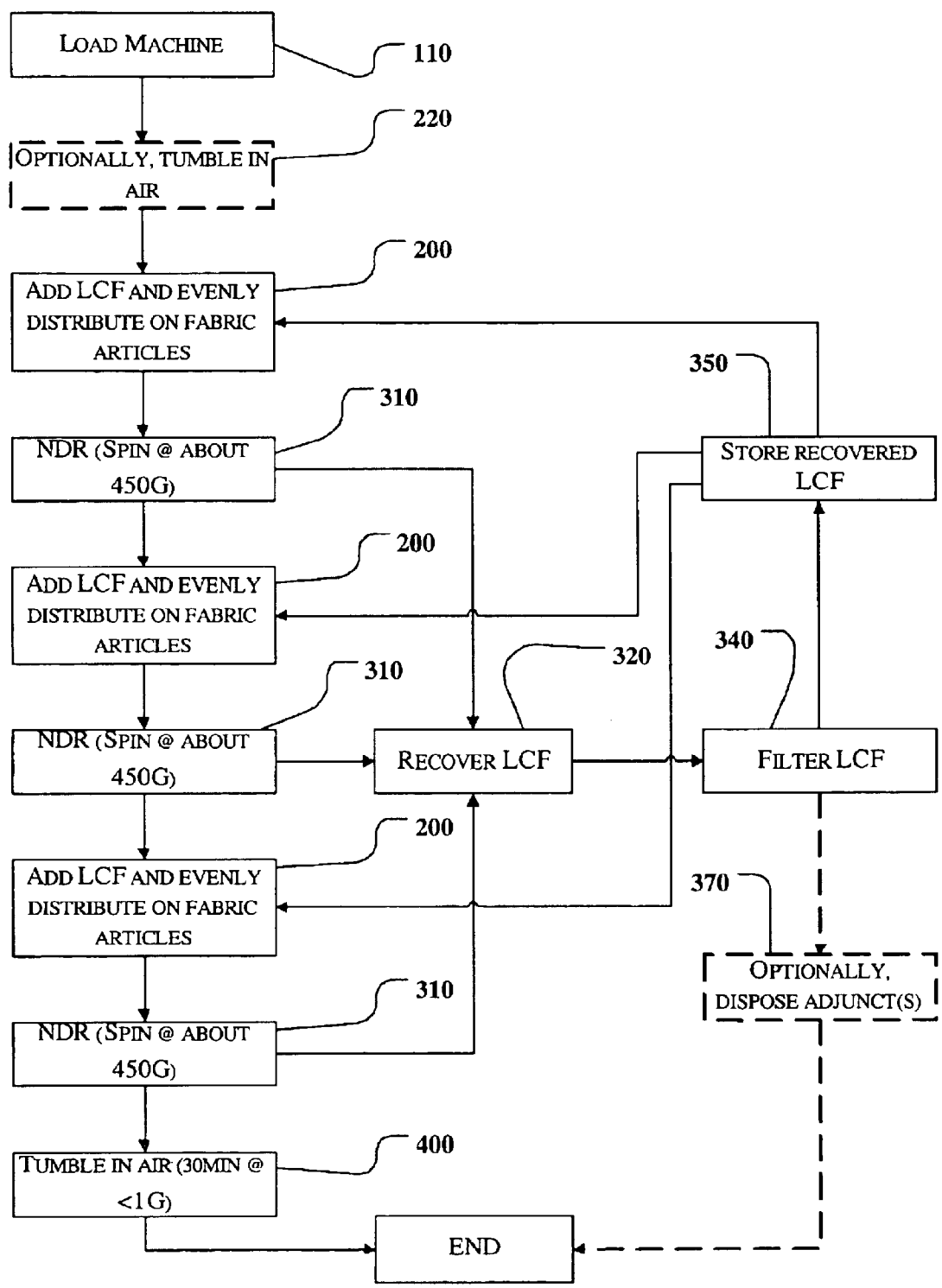
FIG. 6 is a flowchart diagram illustrating another low volume method of cleaning a fabric load in accordance with the present invention.

An alternative method is illustrated in FIG. 6 which includes steps for recovery and reuse of the lipophilic cleaning fluid, unlike the method is illustrated in FIG. 5 where the lipophilic cleaning fluid is not reused in the method. The method illustrated in FIG. 6 is identical to that illustrated in FIG. 5 except that it includes steps 340, 350 and 370, filtering the lipophilic cleaning fluid, optionally disposing any adjunct ingredients which are removed from the lipophilic cleaning fluid and storing the lipophilic cleaning fluid instead of disposing of the lipophilic cleaning fluid. In the method illustrated in FIG. 5 which again begins with the loading of the apparatus at step 110. After the fabric is loaded the first step in the method is to even distribute the lipophilic cleaning fluid on to all the fabric loaded into the apparatus at step 200, after the optional gas pre-treatment step 220. The lipophilic cleaning fluid and soil is removed from the fabric by non-distillative removal, in this case spinning the fabric articles at high centrifugal acceleration, step 310 and recovered in step 320. These process steps of even distribution, spinning extraction and recovery are repeated twice more before the fabric articles are tumbled in air in step 400. The lipophilic cleaning fluid which is recovered in step 320 is then treated in step 340 to separate the lipophilic fluid from any soil from the fabrics, adjuncts and any other fluids. This involves the separation of any soil removed from the fabric articles as well as any adjunct ingredients and other fluids, from the lipophilic cleaning fluid. Typically, this includes, but is not limited to, distillation, gravity separation, filtering. The removed soil, adjunct and/or fluids may be stored within the apparatus for later disposal, or they may be disposed down the sewer. The treated lipophilic cleaning fluid, which is now either substantially pure lipophilic fluid or lipophilic cleaning fluid containing adjuncts which can be used multiple times, is then stored in step 350. The stored lipophilic cleaning fluid may be immediately re-used in a subsequent step 200 to which it was first applied to the fabric, either as is or in combination with another fluid or an adjunct ingredient. This would enable any apparatus used in this embodiment of the present invention to contain the minimum amount of lipophilic cleaning fluid necessary for a load the size of its maximum capacity. Alternatively, the treated lipophilic cleaning fluid it may be stored for use in a subsequent cleaning operation. In this situation any apparatus used in this embodiment of the present invention would contain the more than minimum amount of lipophilic cleaning fluid necessary for a load the size of its maximum capacity, for example twice the minimum amount.

Figure 7:
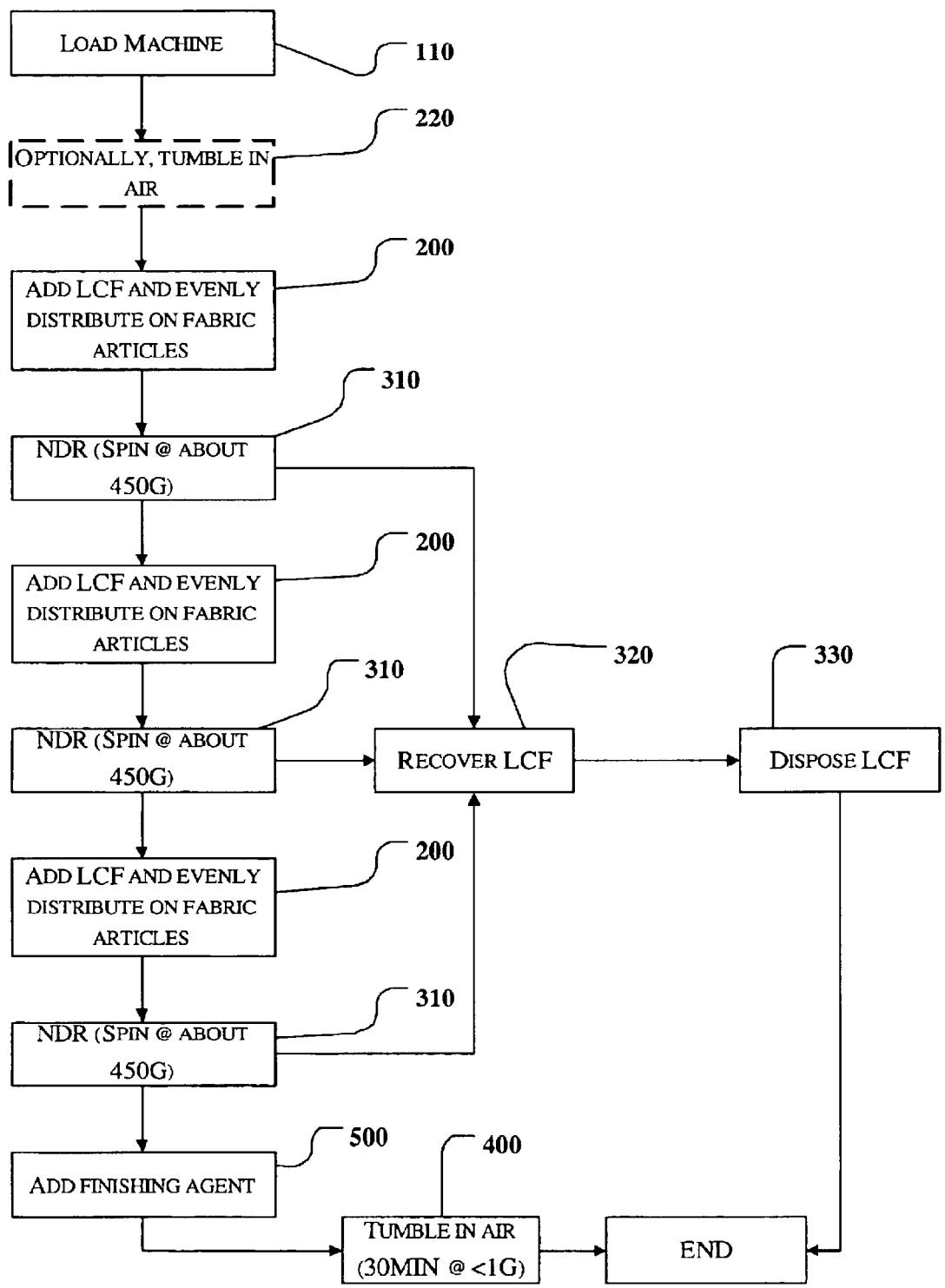
FIG. 7 is a flowchart diagram illustrating another low volume method of cleaning a fabric load in accordance with the present invention.

In yet another alternative method is illustrated in FIG. 7 which includes a finishing step 500, in addition to the steps illustrated in FIG. 5. Again, the apparatus is loaded at step 110. After the fabric is loaded, the first optional step is the pre-treatment of the fabric with gas and tumbling at step 220. The lipophilic cleaning fluid is then evenly distributed onto the fabric articles in step 200, then removed by non-distillative removal, in this case spinning the fabric articles at high centrifugal acceleration, step 310, and collected in step 320, all of which are hereinbefore described. Steps 200, 310 and 320 are repeated twice before a finishing agent is applied to the fabric articles in step 500. The finishing agent is preferably applied to the fabric articles via spraying while the fabric articles are spun at a centrifugal acceleration about 9.8 m/s$^2$. That is, just enough force to hold the garments against the chamber 1. Preferably, the finishing agent is applied to the fabric articles by spraying in multiple stages with tumbling of the fabric articles in between to achieve better surface coverage. Suitable finishing agents include but are not limited to, anti-static agents, fabric softeners, perfumes, sizing agents, with mixtures thereof also possible. The application of anti-static agents/fabric softeners in step 500 is especially preferred. After the application of the finishing agent in step 500 the fabric articles are tumbled in air for about 30 minutes in step 400.

Figure 8:
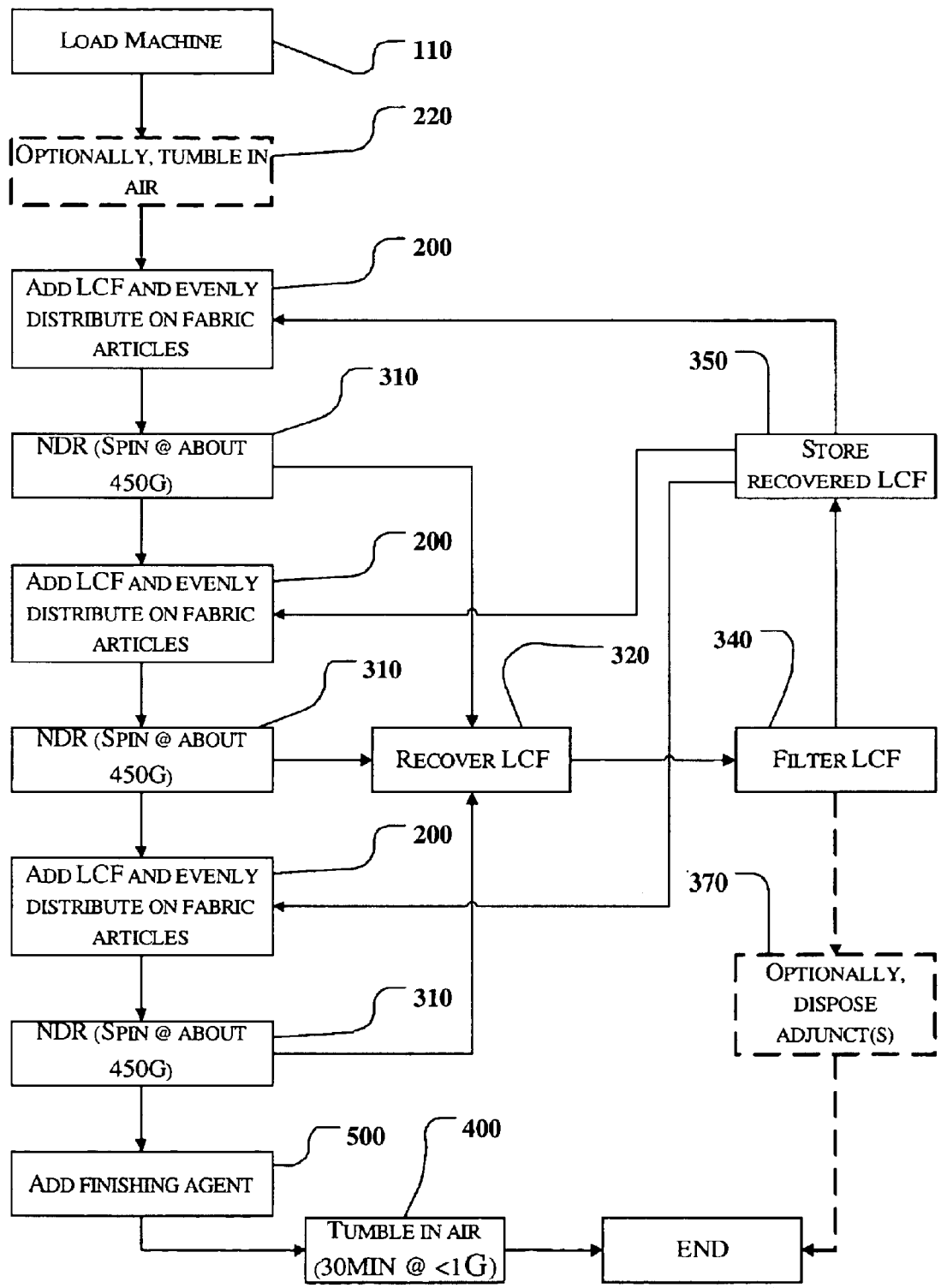
FIG. 8 is a flowchart diagram illustrating another low volume method of cleaning a fabric load in accordance with the present invention.

Turning to FIG. 8, another alternative method which includes a finishing step 500, in addition to the steps illustrated in FIG. 6. Again, the apparatus is loaded at step 110. After the fabric are loaded, the first optional step is the pre-treatment of the fabric with gas and tumbling at step 220. In the method illustrated in FIG. 8, like that illustrated in FIG. 6, the pre-treatment of the fabric articles with gas, 220 is optional. The lipophilic cleaning fluid is then evenly distributed onto the fabric articles in step 200, and then removed by non-distillative removal, in this case spinning the fabric articles at high centrifugal acceleration, step 310, and collected in step 320, all of which are hereinbefore described. Steps 210, 310 and 320 are repeated twice before a finishing agent is applied to the fabric articles in step 500. After the application of the finishing agent in step 500 the fabric articles tumbled in air for about 30 minutes in step 400. The lipophilic cleaning fluid, which may optionally contain adjunct ingredient, and soil recovered in step 320 are then treated in step 340. Optionally, when adjunct ingredients are present they may be separated from the lipophilic fluid and disposed of in step 370, and may be stored within the apparatus for later disposal, or disposed of via way of the sewerage. The treated lipophilic fluid is then stored in step 350. The stored lipophilic fluid may be immediately re-used in a subsequent step 200 to which it was first applied to the fabric. The stored lipophilic fluid when used in step 200 may be added separately or mixed with any adjunct ingredients prior to use in step 200 as detailed previously.

Figure 9:
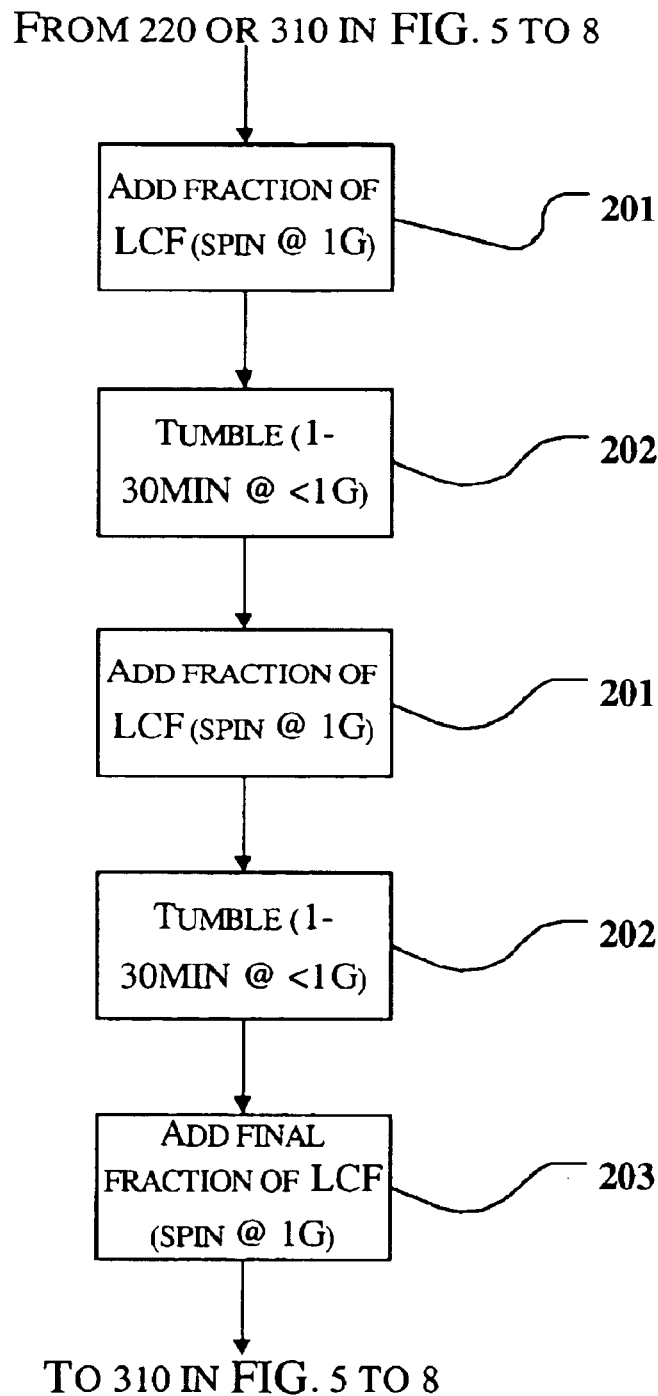
FIG. 9 is a flowchart diagram illustrating another low volume method of cleaning a fabric load in accordance with the present invention.
Figure 10:
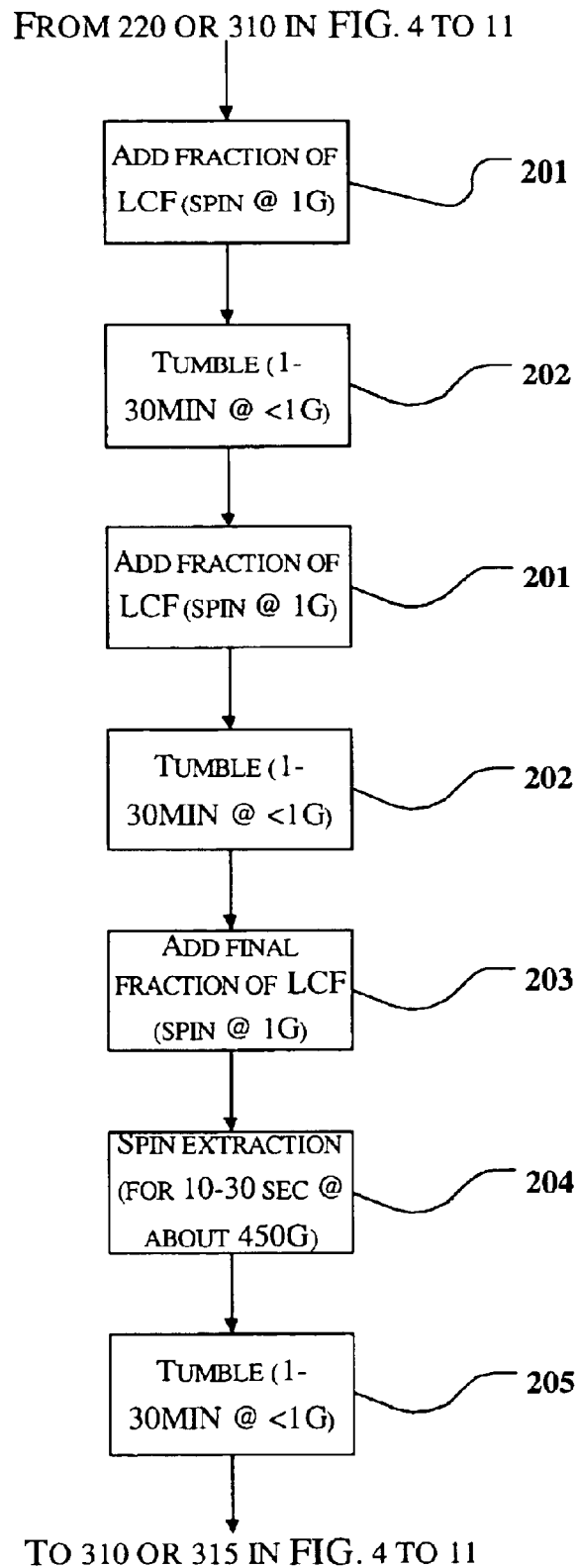
FIG. 10 is a flowchart diagram illustrating another low volume method of cleaning a fabric load in accordance with the present invention.

In FIGS. 9 and 10 two possibly methods detailing how the lipophilic cleaning fluid, is evenly distributed on the fabric articles. These figures are two preferred embodiments of the step 200, which are illustrated in FIGS. 4–8. The arrow into the initial step in FIGS. 9 and 10, namely step 201, is from any step in FIGS. 4–8 which is prior to any step 200 in those figures, namely any one of the possible steps 110, 220 or 310. Similarly, the arrow from the final step FIGS. 9 and 10, namely step 203 in FIG. 9 and step 205 in FIG. 10, is from any step in FIGS. 4–8 which is subsequent to any step 200 in those figures, namely step 310.

One preferred method for evenly distributing the lipophilic cleaning fluid is illustrated in FIG. 9. In this illustrated method, a portion of the lipophilic cleaning fluid is added to the fabric articles in step 201. In this step the fabric articles are spun at a centrifugal acceleration about 9.8 m/s$^2$. That is, just enough force to hold the garments in place and prevent them from tumbling. The lipophilic cleaning fluid is applied to the fabric articles while the fabric articles are spun at about 9.8 m/s$^2$ by spraying. Optionally, an adjunct ingredient may be added to the lipophilic cleaning fluid prior to contacting the fabric articles. The fabric articles are then tumbled for about 1 to about 20 minutes in step 202. This tumbling redistributes the fabric articles and ensures an even distribution of the lipophilic cleaning fluid on the fabric articles. Steps 201 and 202 are repeated with a further portion of the lipophilic cleaning fluid. The final portion of the lipophilic cleaning fluid is applied to the fabric articles while the fabric articles are spun at about 9.8 m/s$^2$ by spraying in step 203. The lipophilic cleaning fluid used in different steps 201 may include different adjunct ingredients, no adjunct ingredients, textile treatment fluids, different lipophilic fluids and/or same lipophilic fluid, fluids and/or adjunct ingredients etc., to that used in previous steps 201 but in different amounts. The fabric articles are then removed by non-distillative removal, in this case spinning the fabric articles at high centrifugal acceleration, step 310, as illustrated in any one of FIGS. 4–8.

Another preferred method for evenly distributing the lipophilic cleaning fluid is illustrated in FIG. 10. In this illustrated method, a portion of the lipophilic cleaning fluid is added to the fabric articles in step 201. In this step the fabric articles are spun at a centrifugal acceleration about 9.8 m/s$^2$. That is, just enough force to hold the garments in place and prevent them from tumbling. The fabric articles are then tumbled for about 1 to about 20 minutes in step 202. Steps 210 and 202 are repeated with a further portion of the lipophilic cleaning fluid, and any optional adjunct ingredient. The final portion of the lipophilic cleaning fluid, and any optional adjunct ingredient, is applied to the fabric articles while the fabric articles are spun at about 9.8 m/s$^2$ by spraying in step 203. The fabric articles are then spun at a centrifugal acceleration of typically about 4450 m/s$^2$ for from about 10 to about 30 seconds in step 204. The fabric articles are then tumbled for about 1 to about 20 minutes in step 205. This tumbling ensures adequate time for any adjunct ingredients optionally present in the lipophilic cleaning fluid, such as bleaches, enzymes, or the like, as well as maximizing the time the lipophilic cleaning fluid is in contact with any soil. The lipophilic cleaning fluid is then removed by non-distillative removal, in this case by spinning the fabric articles at high centrifugal acceleration, step 310, as illustrated in any one of FIGS. 4–8.

In a preferred embodiment of the present invention, the consumables and/or recyclables for use with the apparatus and methods of the present invention are in a form, such as within a tank and/or filter or cartridge that is attachable and detachable from the apparatus via a "lock and key" system, as described above.

Apparatus

In one embodiment of the present invention the apparatus is a modified domestic appliance. That is, washers, especially horizontal axis washers and low wash volume washers, dryers and washer dryers can be modified to be used as the vessels for the processes or the apparatus of the of the present invention. It is one aspect of this embodiment of the present invention that any such modified washers and washer dryers retain the ability to wash and/or dry clothes as they did before modification. This would include all the associated plumbing, such as, connection to a water supply, and sewerage for waste wash water etc. For example, this means that the method of the present invention could be included as a set of additional cycles on a washing machine. This would enable either the consumer or the apparatus's controller to select the appropriate wash cycle depending on the fabric articles to be washed and the soils present.

In another embodiment of the present invention the apparatus is not a modified existing apparatus and is built in such a manner so to only conduct the process of the present invention.

The apparatus of the present invention may optionally have dimensions similar to those of a domestic washer or dryer. That is, the external dimensions and/or the internal dimensions be similar to those of a domestic washer or dryer. Alternatively, apparatus of the present invention may have dimensions similar to those of a commercial drycleaning machine or industrial scale laundering apparatus, such as those used in commercial laundries or Laundromats.

In another embodiment of the present invention the apparatus is not a modified existing apparatus and is built in such a manner so to not only conduct the process of the present invention but also to operate as a conventional washer, washer/dryer, or dryer. This would include all the associated plumbing, such as connection to a water supply, and sewerage for waste wash water. It is one preferred embodiment of the present invention that the apparatus be connected to a drain, air outlet, water inlet, including hot water, cold water and both, or combinations thereof.

In one embodiment of the present invention the apparatus used in the process and the apparatus of the present invention may further comprise at least one trap comprising a filter element, preferably wherein the filter element is contained in a cartridge detachably mounted in said laundering apparatus. The trap may be located in any part of the apparatus. There may be more than one tray or there may be only one trap which is designed to filter, for example fluids as well as gas. Suitable traps, which comprise a filter element, include but are not limited to: a lint filter for removing any airborne particles of lint, fabric fibers etc., which are dislodged form the fabric articles during the treatment process. The lint filter may be designed to remove lint only from gas blown through the apparatus, just like a lint filter does in a conventional dryer. Or the lint filter may be designed to remove particles of lint, fabric fibers etc., from the lipophilic cleaning fluid. A water hardness remover may also be present to remove any water hardness from any water used in the apparatus or process of the present invention. This water hardness remover (e.g., filter) would only be present on apparatus which would be capable of using water in some fashion, such as an adjunct in the lipophilic cleaning fluid, or as part of an independent water wash or pretreat cycle. Such apparatus would be connected to a main water source, or another convenient water supply. Any water entering the apparatus, other than any present on the fabric articles, would pass through the water hardness remover prior to its use in the apparatus or methods of the present invention. The water hardness remover would remove, or at least significantly eliminate, any hardness causing ions, such as calcium and magnesium. The water hardness remover, preferably would be in the form of a cartridge, preferably, which is detachable for easy cleaning or disposal and replacement with a fresh unused water hardness remover. Soil filter could be present in the apparatus of the present invention to remove any soil removed from the fabric articles, as well as spent adjunct ingredients, such as water, surfactants, enzymes, etc., during the treatment process. This would enable the lipophilic fluid or even the lipophilic cleaning fluid to be regenerated and reused.

The apparatus used in the process and the apparatus of the present invention will typically contain an operator program selector control system, for example one using dials, touch panels or the like. These include electrical systems, so called smart control systems in which the appliance acts autonomously in response to a sensed input, as well as manual or more traditional electromechanical systems. The control systems can for example enable the user to select the size of the fabric load to be cleaned, the type of soiling, the extent of the soiling, the time for the cleaning cycle, and the type of cycle (for example cleaning or garment treatment, dry-cleaning or water cleaning, etc.) Alternatively, the user can use pre-set cleaning and/or refreshing cycles, or the apparatus can control the length of the cycle, based on any number of ascertainable parameters. For example, when the collection rate of lipophilic cleaning fluid reaches a steady rate the apparatus can be configured to switch off after a fixed period of time, or initiate another application of the lipophilic cleaning fluid.

In one embodiment of the present invention the apparatus used in the process and the apparatus of the present invention may comprise a program selector. This selector may be in any suitable form, such as a dial, buttons, touch pads, panel (which would typically include buttons or assorted selection means) or combinations thereof. Furthermore, it is well within the scope of the present invention for multiple selectors to be present. For example, using one selector the consumer/operator could input load size, and using another input the predominate type of fabric to be treated (such as, "dry-clean", which would mean presence of dry clean only garments in the wash load). Alternatively, all these functions could be done on one selector. Any such selector would have at least two selector positions. Possible combinations of selector positions include:

1. at least one selected from "dry-clean", "delicate care label" and "light soil" and at least one selected from "water wash", "normal", and "high soil";
2. at least one selected from "dry-clean", "delicate care label" and "light soil" and at least one selected from "refresh", "deodorize", "fabric treatment" and "rinse/soften";

In one preferred embodiment any programmable selector would have at least three selector positions including at least one selected from "dry-clean", "delicate care label" and "light soil", at least one selected from "water wash", "normal", and "high soil", and at least one selected from "refresh", "deodorize", "fabric treatment" and "rinse/soften".

The term "machine washable fabric articles", as used herein, means those fabric articles readily identified by the fabric industry and consumers as safe for laundering by a conventional aqueous automatic home laundry process. Consumers are frequently helped in this identification of fabric articles by manufacturer's tags identifying the fabric article as "machine washable" or some similar description.

The term "dry clean only fabric articles", as used herein, means those fabric articles readily identified by the fabric industry and consumers as unsafe for laundering by a conventional aqueous immersive wash automatic home laundry process, and instead requiring special handling with a conventional non-aqueous solvent such as Perc. Again, consumers are frequently helped in this identification of fabric articles by manufacturer's tags identifying the fabric article as "dry clean only" or some similar description.

In the case of electrical control systems, one option is to make the control device a so called "smart device". This can include but not be limited to, a self diagnostic system, load type and cycle selection, linking the machine to the Internet, or allowing the consumer to start the apparatus remotely, to be informed or advised when the apparatus has cleaned a fabric article, or for the supplier to remotely diagnose problems if the apparatus should break down. Furthermore, if the apparatus of the present invention is only a part of a cleaning system, the so called "smart system" could be one having the capability to communicate with the other cleaning devices which would be used to complete the remainder of the cleaning process, such as a washing machine or a dryer.

The fluid pervious movable chamber in one embodiment of the present invention has a curved cylindrical surface and a back wall, and is substantially horizontally mounted. Preferably the fluid pervious movable chamber is a drum, which may be any shape which will allow for free tumbling and high speed spinning of fabric articles. This includes, but is not limited to, hexagonal-section "cylinders", octagonal-section "cylinders" and true cylinders. The drums can be made of any suitable material. For example, suitable material includes aluminium, stainless steel, polymeric material and combinations thereof. The drum may have a uniformly even surface internally, however, it may also have a variety of raised or recessed sections, more preferably raised, on the internal surface of the drum. Such raised sections can include ridges or bumps regularly placed on the internal surface of the drum. Such a regular placement is highly desired as it aids in the rotation of the drum. These ridges or bumps may optionally run the length of the drum. An illustrative example of such a drum can be found in FIGS. 1 and 2.

In one embodiment of the present invention the spray device is configured so as to preferentially wet the cylindrical curved surface rather than said back wall, and wherein the at least one spray device comprises a nozzle capable of delivering a droplet size of from about 10 to about 1200 micron, preferably from about 100 to about 1000 micron.

In another aspect of one embodiment of the present invention the quantity of the lipophilic cleaning fluid within the fluid-pervious movable chamber at any point in time does not exceed about 5 times the dry weight of the fabric articles, and preferably does not exceed about 1.5 times the dry weight, of said fabric articles.

In another embodiment of the present invention, any detachably mounted components, such as traps, filters, storage means (both cartridge and non-cartridge storage means) are accessible from positions selected from the top and front faces of said appliance. An illustration of such an arrangement is illustrated in FIG. 3.

In a preferred embodiment of the present invention apparatus may optionally contain one or more of:

(a) at least one trap comprising a filter element, such as, those traps described previously (b) one or more adjunct storage means for storing adjunct ingredient(s), preferably detachably mounted on the apparatus;

(c) a connection to a drain, air outlet or combinations thereof;

(d) at least one gas inlet, preferably capable of providing air, optionally with ozone and/or electrostatically treated air, of a suitable humidity and temperature;

(e) an ozone source;

(f) a lipophilic fluid recovery system;

(g) an outlet vent gas treatment NOC control system;

(h) physical static control means; (e.g., corona discharge)

(i) an electric motor, such as variable speed, fixed speed (a clutch and gearing would be used to achieve the different speeds as required), brushless motor;

(j) a heater, for heating the gas or heating the lipophilic cleaning fluid;

(k) a compressor;

(l) a vacuum pump;

(m) an inert gas supply means, such as argon, helium, xenon, etc;

(n) a safety interlock, such as locks on any access door to prevent opening the apparatus while it was in use;

(o) steam inlet; and (p) sensor means, preferably selected from VOC, vibration, ozone, humidity, temperature and pressure sensor means In another aspect of the present invention the apparatus includes at one least sensor for garment tag detection, preferably the garment tag detector is a radiofrequency detector. In this embodiment the fabric articles have a machine-detectable tag, which is detected by the apparatus enabling the apparatus to select an appropriate treatment cycle/process based on the fabric articles fabric type, e.g., silk, denim, wool, rayon, cotton, "dry-clean only", etc., present in the fabric articles to be treated.

The present invention may also be performed in an apparatus capable of "dual mode" functions. A "dual mode" apparatus is one capable of both washing and drying fabrics within the same drum. These apparati are commercially available particularly in Europe.

Methods

One embodiment of the present invention is a method for treating fabric articles in an apparatus of the present invention. In one embodiment of this aspect of the present invention the method comprises treating one or more of said fabric articles with an applicator-remover capable of (i) evenly distributing a lipophilic cleaning fluid on a retained load of fabric articles and (ii) removing said lipophilic cleaning fluid from said articles.

In one aspect of this embodiment of the present invention the applicator-remover comprises a fluid-impervious stationary containment chamber and the applicator-remover distributes and removes said lipophilic cleaning fluid simultaneously or consecutively without substantially immersing said fabric articles in a bath of said lipophilic cleaning fluid.

The method of the present invention may optionally comprise the step of forming in-situ an emulsion or microemulsion comprising two or more fluid streams, such as the lipophilic cleaning fluid and water or another cleaning adjunct, preferably the lipophilic fluid and water, immediately prior to evenly distributing the lipophilic cleaning fluid on a retained load of fabric articles within the apparatus of the present invention.

Oil-in-water emulsion formation can be brought about by any number of suitable procedures. For example, the aqueous phase containing an effective amount of surfactant package can be contacted with the solvent phase by metered injection just prior to a suitable mixing device. Metering is preferably maintained such that the desired solvent/water ratio remains relatively constant. Mixing devices such as pump assemblies or in-line static mixers, a centrifugal pump or other type of pump, a colloid mill or other type of mill, a rotary mixer, an ultrasonic mixer and other means of dispersing one liquid in another, non-miscible liquid can be used to provide sufficient agitation to cause emulsification. These static mixers are devices through which the emulsion is passed at high speed and in which said emulsion experiences sudden changes in direction and/or in the diameter of the channels which make up the interior of the mixers. This results in a pressure loss, which is a factor in obtaining a correct emulsion in terms of droplet size and stability.

In one variant of the method of the invention, the mixing steps are for example sequential. The procedure consists in mixing the solvent and emulsifier in a first stage, the premix being mixed and emulsified with the water in a second stage.

In another variant of the method of the invention, provision is made for carrying out the above steps in a continuous mode.

The invention takes place at room temperature, which is also the temperature of the fluids and raw materials used.

A batch process such as an overhead mixer or a continuous process such as a two fluid coextrusion nozzle, an in-line injector, an in-line mixer or an in-line screen can be used to make the emulsion. The size of the emulsion composition in the final composition can be manipulated by changing the mixing speed, mixing time, the mixing device and the viscosity of the aqueous solution. In general, by reducing the mixing speed, decreasing the mixing time, lowering the viscosity of the aqueous solution or using a mixing device that produces less shear force during mixing, one can produce an emulsion of a larger droplet size.

In a further aspect of this embodiment of the present invention the applicator-remover conducts fluid extraction at least partially simultaneously with fluid distribution. In this embodiment of the present invention it is preferred that the even distributing is accomplished by spraying said lipophilic fluid through at least one spray nozzle and wherein the fabric articles are moving in said fluid-pervious movable chamber at the time of spraying.

In a further aspect of this embodiment of the present invention a pattern of speed changes is used to redistribute the fabric in the fluid-pervious movable chamber, thereby achieving even wetting.

Another embodiment of the present invention method for treating fabric articles in an apparatus of the present invention. In one embodiment of this aspect of the present invention the method comprises (I) one or more steps of prespotting, soaking or pretreating a fabric article or a load of fabric articles by any conventional process; and (II) at least one step of treating said fabric article or load of fabric articles in an appliance according to any of the foregoing appliance claims.

By "one or more steps of prespotting, soaking or pretreating a fabric article or a load of fabric articles by any conventional process" it is meant that the fabric article or load is pretreated, prespotted or soaked exactly as if they were to be treated before being cleaned or treated either a conventional domestic or commercial aqueous laundry apparatus, or commercial dry cleaning apparatus. For example, the fabric article or load is let soak overnight immersed in an aqueous bath containing a bleach solution and then treated in the apparatus of the present invention; or a preatreater solution is applied to stain on a fabric article which is then treated in the apparatus of the present invention, etc.

In another embodiment of this aspect of the present invention the method comprises (I) at least one step of treating a fabric article or load of fabric articles in an appliance according to any of the foregoing appliance claims and (II) one or more steps of posttreating said fabric article or a load of fabric articles by any conventional process.

By "one or more steps of posttreating the fabric article or a load of fabric articles by any conventional process" it is meant that the fabric article or load is posttreated exactly as if they were to be posttreated after being cleaned or treated in a conventional domestic or commercial water laundry apparatus, or commercial dry cleaning apparatus. For example, the fabric article is contacted with a fabric softener after being treated in the apparatus of the present invention, etc.

The apparatus of the present invention may be used for refreshing and/or cleaning a fabric article. Furthermore, the apparatus of the present invention may be used for alternately cleaning loads of fabric articles in any of said garment cleaning or garment treatment modes.

The apparatus of the present invention may be used in a service, such as a dry cleaning service, diaper service, uniform cleaning service, or commercial business, such as a Laundromat, dry cleaner, linen service which is part of a hotel, restaurant, convention center, airport, cruise ship, port facility or casino.

In another embodiment of the present invention the apparatus of the present invention may be used for treating an unsorted load of fabric articles without substantial damage or dye-transfer between said articles. By "unsorted fabric articles" it is meant that the fabric articles to be treated comprise two or more articles selected from the group consisting of articles having "dry clean only" care labels. In other words, it is one embodiment of the present invention that an apparatus and method of treating using the same apparatus, which clean dry clean only fabrics at the same time, and in the same apparatus, as fabrics which can be water washed.

In another embodiment of the present invention is directed to a fabric article which has been treated in an apparatus according to the present invention. It is preferred that any such treated fabric article comprise an analytically detectable amount of at least one compound (e.g., an organosilicone) having a surface energy modifying effect but no antistatic effect; or an analytically detectable amount of at least one compound having a surface energy modifying and/or feel-modifying and/or comfort-modifying and/or aesthetic effect and at least one antistatic agent other than said at least one compound.

Water, if any, used in the apparatus and methods of the present invention is preferably treated to soften, filter, disinfect, heat, cool, and the like prior to being used in the apparatus and in the methods.

Examples of known approaches to water treatment systems and apparatus are described in the following patents.

U.S. Pat. No. 4,504,389 to Rundzaitis discloses a water filter mounted on a faucet and containing therein a replaceable filter cartridge having four stages.

U.S. Pat. No. 4,876,014 to Malson describes a counter top unit for producing pure water. It utilizes a multi chamber filed with purification media (ion exchange) to purify an aqueous media, a disinfectant ultraviolet source, and means for measuring the purity of the aqueous media.

U.S. Pat. No. 4,894,154 to Roz discloses an individual portable water treatment device having a cartridge for filtering suspended materials, an active carbon charge, a charge of anion and cation exchange resins and a bacteria filtering cartridge.

U.S. Pat. Nos. 4,898,667, and 4,976,876, both to Diman et al, relate to point-of-use membrane filtration systems used for micro filtration, ultrafiltration or hyper filtration, depending upon the membrane pore size. The automatic control system is programmed to accomplish purge, rinse-up and sanitization procedures at predetermined intervals with predetermined combinations of procedures.

U.S. Pat. No. 5,024,766 to Mahmud has, as an objective, to maintain the purity of an ultra pure water source at a low Total Organic Carbon (TOC) and bacteria at point-of-use. A purified water source with specific resistance of 17–18 meg ohm/cm is required. The point-of-use system includes a circulation loop that contains a pump, an ultraviolet unit, a 0.2 micron filter, a twin mixed bed polisher, and an ozone generator sterilizer.

U.S. Pat. No. 5,190,659 to Wang has, as its object, to provide a point-of-entry (POE) water conditioning system. The proposed system will partially treat water contaminants. It is not intended to produce high purity water. The primary components are the vessels for filter media (a wide array of reactive and regenerative compounds are disclosed with each compound intended to treat specific problems), a process tank for regeneration and chemical circulation, a central flow control (without a description of how it works), a pump and ultraviolet units.

U.S. Pat. Nos. 5,529,689 and 5,573,666, both to Korin, describe filtration/sterilization assemblies which comprise a filtration and ultraviolet sterilization cartridge replaceably disposed within a filtration housing.

Kits

The apparatus and methods of the present invention also include within their scope kits. These kits typically include consumable items, such as, lipophilic fluid, lipophilic cleaning fluid, adjuncts, filters, etc., as well as instructions on how to use the kit. In one embodiment a kit comprising two or more of said detachable components. In another embodiment the kit includes instructions which detail how to remove consumable items, such as, any specific storage means, filter, etc., and replace it with the equivalent storage means filter, etc., included in the kit.

In another embodiment of the present invention a packaged goods consumer product is envisioned. Such a consumer product comprises:

(a) at least one kit comprising one or more consumable adjunct composition for use in an appliance according to the present invention; and (b) separate from, or affixed to any element of said kit, printed or machine-readable instructions for use of said adjunct composition.

Lipophilic Cleaning Fluid

The lipophilic cleaning fluid herein is a composition comprising from at least about 50% to about 100% by weight of lipophilic cleaning fluid of a lipophilic fluid and optionally from about 0% to about 50% by weight of lipophilic cleaning fluid of an adjunct ingredient, for example textile treatment liquid, surfactants, bleaches etc. The lipophilic cleaning fluid can comprise one or more liquid phases and can have emulsion or microemulsion form. The lipophilic fluid and adjunct ingredients will now be explained in more detail.

The total amount of lipophilic cleaning fluid used in one treatment cycle, that is the total amount of lipophilic cleaning fluid applied to and removed from the fabric articles from the time the fabric articles are first place in the apparatus till they are removed dry at the end of the treatment cycle is from about 10% to about 1500%, even more preferably from about 10% to about 1000%, even more preferably from about 10% to about 500%, even more preferably from about 30% to about 400%, even more preferably from about 80% to about 300%, even more preferably still from about 100% to about 200% by weight of the dry fabric articles.

The amount of lipophilic cleaning fluid which is used in the first application of lipophilic cleaning fluid in a treatment process is from about 10% to about 500%, more preferably from about 20% to about 200%, even more preferably from about 35% to about 150%, even more preferably still from about 50% to about 120% by weight of the dry fabric articles.

The amount of lipophilic cleaning fluid which is used in any application other than the first application of lipophilic cleaning fluid in a treatment process is from about 10% to about 200%, more preferably from about 10% to about 100%, even more preferably from about 20% to about 80%, even more preferably still from about 25% to about 60% by weight of the dry fabric articles.

In any event, these ranges of lipophilic cleaning fluid used in the process of the present invention are to be in no way construed as to limit the amount of lipophilic cleaning fluid which may be present in any apparatus in accordance with the present invention. For example, an apparatus of the present invention may contain 20,000% by weight of the dry fabric articles in appropriate storage means. Any treatment process performed using the apparatus would use the amounts of lipophilic cleaning fluid indicated above, with the remainder of the lipophilic cleaning fluid kept in storage for future use. Alternatively, the stored lipophilic cleaning fluid could be lipophilic cleaning fluid which was recovered form a previous process and is currently being "treated", such as by distillation, filtration and the like, in preparation for a future use in a treatment process.

One suitable lipophilic cleaning fluid composition comprises about 85% to 90% by weight of lipophilic fluid, preferably a silicone, such as cyclopentasiloxane, and from about 15% to about 10% of adjunct ingredients.

Lipophilic Fluid

The lipophilic fluid herein is one having a liquid phase present under operating conditions of the appliance. In general such a fluid can be fully liquid at ambient temperature and pressure, can be an easily melted solid, e.g., one which becomes liquid at temperatures in the range from about 0 deg. C to about 60 deg. C, or can comprise a mixture of liquid and vapor phases at ambient temperatures and pressures, e.g., at 25 deg. C and 1 atm. pressure. Thus, the essential lipophilic fluid is not a compressible gas such as carbon dioxide. It is preferred that the lipophilic fluid herein be inflammable or, have relatively high flash points and/or low VOC characteristics, these terms having their conventional meanings as used in the dry cleaning industry, to equal or, preferably, exceed the characteristics of known conventional dry cleaning fluids. Moreover, suitable lipophilic cleaning fluids herein are readily flowable and nonviscous. In general, lipophilic cleaning fluid herein are required to be fluids capable of at least partially dissolving sebum or body soil as defined in the test hereinafter. Mixtures of lipophilic fluid are also suitable, and provided that the requirements of the test are met, the lipophilic fluid can include any fraction of dry-cleaning solvents, especially newer types including fluorinated solvents, or perfluorinated amines. Some perfluorinated amines such as perfluorotributylamines while unsuitable for use as lipophilic fluid may be present as one of many possible adjuncts present in the lipophilic cleaning fluid; Other suitable lipophilic fluids include diol solvent systems e.g., higher diols such as C6- or C8- or higher diols; organosilicon solvents including both cyclic and acyclic types, and the like; and mixtures thereof. A preferred group of nonaqueous liquids suitable for incorporation as the major component of the lipophilic cleaning fluid includes low-volatility nonfluorinated organics, silicones, especially those other than aminofunctional silicones, and mixtures thereof. Low volatility nonfluorinated organics include for example OLEAN and other polyol esters, or certain relatively non-volatile biodegradable mid-chain branched petroleum fractions. Suitable silicones for use as a major component, e.g., more than 50%, of the lipophilic cleaning fluid include cyclopentasiloxane, sometimes termed "D5", or linear analogs having approximately similar volatility, optionally complemented by other compatible silicones. Suitable silicones are well known in the literature, see, for example, Kirk Othmer's Encyclopedia of Chemical Technology, and are available from a number of commercial sources, including General Electric, Toshiba Silicone, Bayer, and Dow Corning. Other suitable fluids are commercially available from Procter & Gamble or from Dow Chemical and other suppliers. For example one suitable silicone is SF-1528 available from GE silicone fluids. It is worth noting that SF-1528 fluid is 90% cyclopentasiloxane (D5).

Qualification of Lipophilic Fluid and Lipophilic Fluid Test (LF Test)

Any non-aqueous fluid that is both capable of meeting known requirements for a dry-cleaning fluid (e.g., flash point etc.) and is capable of at least partially dissolving sebum, as indicated by the test method described below, is suitable as a lipophilic fluid herein. The ability of a particular material to remove sebum can be measured by any known technique. As a general guideline, perfluorobutylamine (Fluorinert FC-43®) on its own (with or without adjuncts) is a reference material which by definition unsuitable as the lipophilic fluid herein (it is essentially a nonsolvent) while D5 has suitable sebum-dissolving properties and dissolves sebum.

The following is the method for investigating and qualifying other materials, e.g., other low-viscosity, free-flowing silicones, for use as the lipophilic cleaning fluid. The method uses commercially available Crisco® canola oil, oleic acid (95% pure, available from Sigma Aldrich Co.) and squalene (99% pure, available from J. T. Baker) as model soils for sebum. The test materials should be substantially anhydrous and free from any added adjuncts, or other materials during evaluation.

Prepare three vials. Place 1.0 g of canola oil in the first; in a second vial place 1.0 g of the oleic acid (95%), and in a third and final vial place 1.0 g of the squalene (99.9%). To each vial add 1 g of the fluid to be tested for lipophilicity. Separately mix at room temperature and pressure each vial containing the lipophilic soil and the fluid to be tested for 20 seconds on a standard vortex mixer at maximum setting. Place vials on the bench and allow to settle for 15 minutes at room temperature and pressure. If, upon standing, a single phase is formed in any of the vials containing lipophilic soils, then the fluid qualifies as suitable for use as a "lipophilic fluid" in accordance with the invention. However, if two or more separate layers are formed in all three vials, then the amount of fluid dissolved in the oil phase will need to be further determined before rejecting or accepting the fluid as qualified.

In such a case, with a syringe, carefully extract a 200 microliter sample from each layer in each vial. The syringe-extracted layer samples are placed in GC autosampler vials and subjected to conventional GC analysis after determining the retention time of calibration samples of each of the three models soils and the fluid being tested. If more than 1% of the test fluid by GC, preferably greater, is found to be present in any one of the layers which consists of the oleic acid, canola oil or squalene layer, then the test fluid is also qualified for use as a lipophilic fluid. If needed, the method can be further calibrated using heptacosafluorotributylamine, i.e., Fluorinert FC-43 (fail) and cyclopentasiloxane (pass).

A suitable GC is a Hewlett Packard Gas Chromatograph HP5890 Series II equipped with a split/splitless injector and FID. A suitable column used in determining the amount of lipophilic fluid present is a J&W Scientific capillary column DB-1HT, 30 meter, 0.25 mm id, 0.1 um film thickness cat# 1221131. The GC is suitably operated under the following conditions:

Carrier Gas: Hydrogen
Column Head Pressure: 9 psi
Flows: Column Flow @ ~1.5 ml/min.
  Split Vent @ ~250–500 ml/min.
  Septum Purge @ 1 m/min.
Injection: HP 7673 Autosampler, 10 ul syringe, 1 ul injection
Injector Temperature: 350° C.
Detector Temperature: 380° C.
Oven Temperature Program: initial 60° C. hold 1 min.
  rate 25° C./min.
  final 380° C. hold 30 min.

Preferred lipophilic fluids suitable for use herein can further be qualified for use on the basis of having an excellent garment care profile. Garment care profile testing is well known in the art and involves testing a fluid to be qualified using a wide range of garment or fabric article components, including fabrics, threads and elastics used in seams, etc., and a range of buttons. Preferred lipophilic fluids for use herein have an excellent garment care profile, for example they have a good shrinkage or fabric puckering profile and do not appreciably damage plastic buttons. For purposes of garment care testing or other qualification, e.g., flammability, a lipophilic fluid for use in the lipophilic cleaning fluid can be present in a mixture, e.g., with water, at approximately the ratio to be used in the final cleaning fluid which will come into contact with fabric articles in the appliance. Certain materials which in sebum removal qualify for use as lipophilic fluids, for example ethyl lactate, can be quite objectionable in their tendency to dissolve buttons, and if such a material is to be used in the lipophilic cleaning fluid, it will be formulated with water and/or other solvents such that the overall mix is not substantially damaging to buttons. Other lipophilic fluids, D5, for example, meets the garment care requirements quite admirably. Some suitable lipophilic fluids may be found in granted U.S. Pat. Nos. 5,865,852; 5,942,007; 6,042,617; 6,042,618; 6,056,789; 6,059,845; and 6,063,135 which are incorporated herein by reference.

Lipophilic solvents can include linear and cyclic polysiloxanes, hydrocarbons and chlorinated hydrocarbons. More preferred are the linear and cyclic polysiloxanes and hydrocarbons of the glycol ether, acetate ester, lactate ester families. Preferred lipophilic solvents include cyclic siloxanes having a boiling point at 760 mm Hg. of below about 250° C. Specifically preferred cyclic siloxanes for use in this invention are octamethylcyclotetrasiloxane, decamethylcyclopentasiloxane, and dodecamethylcyclohexasiloxane. Preferably, the cyclic siloxane comprises decamethylcyclopentasiloxane (D5, pentamer) and is substantially free of octamethylcyclotetrasiloxane (tetramer) and dodecamethylcyclohexasiloxane (hexamer).

However, it should be understood that useful cyclic siloxane mixtures might contain, in addition to the preferred cyclic siloxanes, minor amounts of other cyclic siloxanes including octamethylcyclotetrasiloxane and hexamethylcyclotrisiloxane or higher cyclics such as tetradecamethylcycloheptasiloxane. Generally the amount of these other cyclic siloxanes in useful cyclic siloxane mixtures will be less than about 10 percent based on the total weight of the mixture. The industry standard for cyclic siloxane mixtures is that such mixtures comprise less than about 1% by weight of the mixture of octamethylcyclotetrasiloxane.

Accordingly, the lipophilic fluid of the present invention preferably comprises more than about 50%, more preferably more than about 75%, even more preferably at least about 90%, most preferably at least about 95% by weight of the lipophilic fluid of decamethylcyclopentasiloxane. Alternatively, the lipophilic fluid may comprise siloxanes which are a mixture of cyclic siloxanes having more than about 50%, preferably more than about 75%, more preferably at least about 90%, most preferably at least about 95% up to about 100% by weight of the mixture of decamethylcyclopentasiloxane and less than about 10%, preferably less than about 5%, more preferably less than about 2%, even more preferably less than about 1%, most preferably less than about 0.5% to about 0% by weight of the mixture of octamethylcyclotetrasiloxane and/or dodecamethylcyclohexasiloxane.

Adjunct Ingredients

Adjunct materials can vary widely and can be used at widely ranging levels. For example, detersive enzymes such as proteases, amylases, cellulases, lipases and the like as well as bleach catalysts including the macrocyclic types having manganese or similar transition metals all useful in laundry and cleaning products can be used herein at very low, or less commonly, higher levels. Adjunct materials which are catalytic, for example enzymes, can be used in "forward" or "reverse" modes, a discovery independently useful from the specific appliances of the present invention. For example, a lipolase or other hydrolase may be used, optionally in the presence of alcohols as adjuncts, to convert fatty acids to esters, thereby increasing their solubility in the lipophilic cleaning fluid. This is a "reverse" operation, in contrast with the normal use of this hydrolase in water to convert a less water soluble fatty ester to a more water-soluble material. In any event, any adjunct ingredient must be suitable for use in combination with the lipophilic fluid.

Some suitable cleaning additives include, but are not limited to, builders, surfactants, enzymes, bleach activators, bleach catalysts, bleach boosters, bleaches, alkalinity sources, antibacterial agents, colorants, perfumes, pro-perfumes, finishing aids, lime soap dispersants, odor control agents, odor neutralizers, polymeric dye transfer inhibiting agents, crystal growth inhibitors, photobleaches, heavy metal ion sequestrants, anti-tarnishing agents, anti-microbial agents, anti-oxidants, anti-redeposition agents, soil release polymers, electrolytes, pH modifiers, thickeners, abrasives, divalent or trivalent ions, metal ion salts, enzyme stabilizers, corrosion inhibitors, diamines or polyamines and/or their alkoxylates, suds stabilizing polymers, solvents, process aids, fabric softening agents, optical brighteners, hydrotropes, suds or foam suppressors, suds or foam boosters and mixtures thereof.

The term "surfactant" conventionally refers to materials which are surface-active in water. Some illustrative surfactants include nonionic, cationic and silicone surfactants as used in conventional aqueous detergent systems. Suitable nonionic surfactants include, but are not limited to:

a) Polyethylene oxide condensates of nonyl phenol and myristyl alcohol, such as in U.S. Pat. No. 4,685,930 Kasprzak; and b) fatty alcohol ethoxylates, R—$(OCH_2CH_2)_aOH$ a=1 to 100, typically 12–40, R=hydrocarbon residue 8 to 20 C atoms, typically linear alkyl. Examples polyoxyethylene lauryl ether, with 4 or 23 oxyethylene groups; polyoxyethylene cetyl ether with 2, 10 or 20 oxyethylene groups; polyoxyethylene stearyl ether, with 2, 10, 20, 21 or 100 oxyethylene groups; polyoxyethylene (2), (10) oleyl ether, with 2 or 10 oxyethylene groups. Commercially available examples include, but are not limited to: ALFONIC, BRU, GENAPOL, NEODOL, SURFONIC, TRYCOL. See also U.S. Pat. No. 6,013,683 Hill et al.,.

Suitable cationic surfactants include, but are not limited to dialkyldimethylammonium salts having the formula:

$$R'R''N^+(CH_3)_2X^-$$

Where each R'R" is independently selected from the group consisting of 12–30 C atoms or derived from tallow, coconut oil or soy, X=Cl or Br, Examples include: didodecyldimethylammonium bromide (DDAB), dihexadecyldimethyl ammonium chloride, dihexadecyldimethyl ammonium bromide, dioctadecyldimethyl ammonium chloride, dieicosyldimethyl ammonium chloride, didocosyldimethyl ammonium chloride, dicoconutdimethyl ammonium chloride, ditallowdimethyl ammonium bromide (DTAB). Commercially available examples include, but are not limited to: ADOGEN, ARQUAD, TOMAH, VARIQUAT. See also U.S. Pat. No. 6,013,683 Hill et al.

Suitable silicone surfactants include, but are not limited to the polyalkyleneoxide polysiloxanes having a dimethyl polysiloxane hydrophobic moiety and one or more hydrophilic polyalkylene side chains and have the general formula:

$$R^1—(CH_3)_2SiO—[(CH_3)_2SiO]_a—[(CH_3)(R^1)SiO]_b—Si(CH_3)_2—R^1$$

wherein a+b are from about 1 to about 50, preferably from about 3 to about 30, more preferably from about 10 to about 25, and each $R^1$ is the same or different and is selected from the group consisting of methyl and a poly(ethyleneoxide/propyleneoxide) copolymer group having the general formula:

$$—(CH_2)_nO(C_2H_4O)_c(C_3H_6O)_dR^2$$

with at least one $R^1$ being a poly(ethyleneoxide/propyleneoxide) copolymer group, and wherein n is 3 or 4, preferably 3; total c (for all polyalkyleneoxy side groups) has a value of from 1 to about 100, preferably from about 6 to about 100; total d is from 0 to about 14, preferably from 0 to about 3; and more preferably d is 0; total c+d has a value of from about 5 to about 150, preferably from about 9 to about 100 and each $R^2$ is the same or different and is selected from the group consisting of hydrogen, an alkyl having 1 to 4 carbon atoms, and an acetyl group, preferably hydrogen and methyl group. Examples of these surfactants may be found in U.S. Pat. No. 5,705,562 Hill and U.S. Pat. No. 5,707,613 Hill, both of which are incorporated herein by reference.

Examples of this type of surfactants are the Silwet® surfactants which are available CK Witco, OSi Division, Danbury, Conn. Representative Silwet surfactants are as follows.

| Name | Average MW | Average a + b | Average total c |
|------|-----------|---------------|-----------------|
| L-7608 | 600 | 1 | 9 |
| L-7607 | 1,000 | 2 | 17 |
| L-77 | 600 | 1 | 9 |
| L-7605 | 6,000 | 20 | 99 |
| L-7604 | 4,000 | 21 | 53 |
| L-7600 | 4,000 | 11 | 68 |
| L-7657 | 5,000 | 20 | 76 |
| L-7602 | 3,000 | 20 | 29 |

The molecular weight of the polyalkyleneoxy group ($R^1$) is less than or equal to about 10,000. Preferably, the molecular weight of the polyalkyleneoxy group is less than or equal to about 8,000, and most preferably ranges from about 300 to about 5,000. Thus, the values of c and d can be those numbers which provide molecular weights within these ranges. However, the number of ethyleneoxy units ($—C_2H_4O$) in the polyether chain ($R^1$) must be sufficient to render the polyalkyleneoxide polysiloxane water dispersible or water soluble. If propyleneoxy groups are present in the polyalkylenoxy chain, they can be distributed randomly in the chain or exist as blocks. Preferred Silwet surfactants are L-7600, L-7602, L-7604, L-7605, L-7657, and mixtures thereof. Besides surface activity, polyalkyleneoxide polysiloxane surfactants can also provide other benefits, such as antistatic benefits, and softness to fabrics.

The preparation of polyalkyleneoxide polysiloxanes is well known in the art. Polyalkyleneoxide polysiloxanes of the present invention can be prepared according to the procedure set forth in U.S. Pat. No. 3,299,112, incorporated herein by reference.

Another suitable silicone surfactants is SF-1488 which is available from GE silicone fluids.

These and other surfactants suitable for use in combination with the lipophilic fluid as adjuncts are well known in the art, being described in more detail in Kirk Othmer's Encyclopedia of Chemical Technology, 3rd Ed., Vol. 22, pp. 360–379, "Surfactants and Detersive Systems", incorporated by reference herein. Further suitable nonionic detergent surfactants are generally disclosed in U.S. Pat. No. 3,929,678, Laughlin et al., issued Dec. 30, 1975, at column 13, line 14 through column 16, line 6, incorporated herein by reference.

It has also surprisingly been discovered that certain materials which are surface active in supercritical or subcritical carbon dioxide dry-cleaning can be useful adjuncts in the present process. They have surface-active behavior, but need not necessarily be surfactants in the conventional sense of being surface active in water. Such materials can, for example, comprise one or more $CO_2$-philic moieties and one or more $CO_2$-phobic moieties, and are extensively described and disclosed in various published patents and patent applications from Air Products (see for example the acetylenic alcohols and diols in U.S. Pat. No. 5,789,505), from Air Liquide, Lever/Unilever (see for example U.S. Pat. No. 5,977,045, all surfactants referred to therein being specifically incorporated for use herein), MiCell Corp. and/or Joseph de Simone (see for example U.S. Pat. No. 5,858,022 and U.S. Pat. No. 5,944,996) and other sources. Remarkably, these materials have now been discovered to be useful in a wide range of fabric article and hard surface cleaning processes, whether immersive or non-immersive, that make use of lipophilic cleaning fluids as defined herein; moreover they can broadly be used with Fluorinert FC43 and other fluorinated solvent materials, irrespective of whether these solvent materials dissolve sebum or not and irrespective of the spirit and scope of the present invention.

Suitable odor control agents include agents include, cyclodextrins, odor neutralizers, odor blockers and mixtures thereof. Suitable odor neutralizers include aldehydes, flavanoids, metallic salts, water-soluble polymers, zeolites, activated carbon and mixtures thereof.

Perfumes and perfumery ingredients useful in the present compositions and processes comprise a wide variety of natural and synthetic chemical ingredients, including, but not limited to, aldehydes, ketones, esters, and the like. Also included are various natural extracts and essences which can comprise complex mixtures of ingredients, such as orange oil, lemon oil, rose extract, lavender, musk, patchouli, balsamic essence, sandalwood oil, pine oil, cedar, and the like. Finished perfumes may comprise extremely complex mixtures of such ingredients. In the processes of the present invention, because significantly lower wash volumes are used, more concentrated perfumes in lesser amounts may be used. This is because most, if not all, of the perfume will be applied to the fabric articles and not either washed away never having contacting the fabric or destroyed by the other components of the detergent composition in the wash liquor. Pro-perfumes are also useful in the present invention. Such materials are those precursors or mixtures thereof capable of chemically reacting, e.g., by hydrolysis, to release a perfume, and are described in patents and/or published patent applications to Procter and Gamble, Firmenich, Givaudan and others.

Beaches, especially oxygen bleach types, are another type of additive suitable for use as an adjunct ingredient. This is especially the case for the activated and catalyzed forms with such bleach activators as nonanoyloxybenzenesulfonate and/or any of its linear or branched higher or lower homologs, and/or tetraacetylethylenediamine and/or any of its derivatives or derivatives of phthaloylimidoperoxycaproic acid (PAP) or other imido- or amido-substituted bleach activators including the lactam types, or more generally any mixture of hydrophilic and/or hydrophobic bleach activators (especially acyl derivatives including those of the $C_6$–$C_{16}$ substituted oxybenzenesulfonates).

Also suitable are organic or inorganic peracids both including PAP and other than PAP. Suitable organic or inorganic peracids for use herein include, but are not limited to: percarboxylic acids and salts; percarbonic acids and salts; perimidic acids and salts; peroxymonosulfuric acids and salts; persulphates such as monopersulfate; peroxyacids such as diperoxydodecandioic acid (DPDA); magnesium peroxyphthalic acid; perlauric acid; perbenzoic and alkylperbenzoic acids; and mixtures thereof.

One class of suitable organic peroxycarboxylic acids have the general formula:

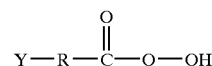

wherein R is an alkylene or substituted alkylene group containing from 1 to about 22 carbon atoms or a phenylene or substituted phenylene group, and Y is hydrogen, halogen, alkyl, aryl, —C(O)OH or —C(O)OOH.

Particularly preferred peracid compounds are those having the formula:

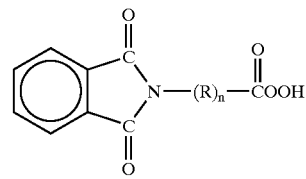

wherein R is $C_{1-4}$ alkyl and n is an integer of from 1 to 5. A particularly preferred peracid has the formula where R is $CH_2$ and n is 5 i.e., phthaloylamino peroxy caproic acid (PAP) as described in U.S. Pat. Nos. 5,487,818, 5,310,934, 5,246,620, 5,279,757 and 5,132,431. PAP is available from Ausimont SpA under the tradename Euroco.

Other cleaning product adjunct materials suitable herein include, but are not limited to, builders including the insoluble types such as zeolites including zeolites A, P and the so-called maximum aluminum P as well as the soluble types such as the phosphates and polyphosphates, any of the hydrous, water-soluble or water-insoluble silicates, 2,2'-oxydisuccinates, tartrate succinates, glycolates, NTA and many other ethercarboxylates or citrates; chelants including EDTA, S,S'-EDDS, DTPA and phosphonates; water-soluble polymers, copolymers and terpolymers; soil release polymers; optical brighteners; processing aids such as crisping agents and/or fillers; anti-redeposition agents; hydrotropes, such as sodium, or calcium cumene sulfonate, potassium napthalenesulfonate, or the like, humectant; other perfumes or pro-perfumes; dyes; photobleaches; thickeners; simple salts; alkalis such as those based on sodium or potassium including the hydroxides, carbonates, bicarbonates and sulfates and the like; and combinations of one or more of these adjunct ingredients.

Suitable finishing aids includes, but are not limited to, finishing polymers; such as synthetic, such as poly acrylates, or natural, such as, starch carboxymethyl cellulose, or hydroxypropyl methyl cellulose, odor control agent, odor neutralizers, perfume, properfume, anti-static agents, fabric softeners, insect and/or moth repelling agents and mixtures thereof.

The finishing polymers can be natural, or synthetic, and can act by forming a film, and/or by providing adhesive properties. E.g., the present invention can optionally use film-forming and/or adhesive polymer to impart shape retention to fabric, particularly clothing. By "adhesive" it is meant that when applied as a solution or a dispersion to a fiber surface and dried, the polymer can attach to the surface. The polymer can form a film on the surface, or when residing between two fibers and in contact with the two fibers, it can bond the two fibers together.

Nonlimiting examples of the finishing polymer that are commercially available are: polyvinylpyrrolidone/dimethylaminoethyl methacrylate copolymer, such as Copolymer 958 molecular weight of about 100,000 and Copolymer 937, molecular weight of about 1,000,000, available from GAF Chemicals Corporation; adipic acid/ dimethylaminohydroxypropyl diethylenetriamine copolymer, such as Cartaretin F-4® and F-23, available from Sandoz Chemicals Corporation; methacryloyl ethyl betaine/methacrylates copolymer, such as Diaformer Z-SM®, available from Mitsubishi Chemicals Corporation; polyvinyl alcohol copolymer resin, such as Vinex 2019®, available from Air Products and Chemicals or Moweol®, available from Clariant; adipic acid/epoxypropyl diethylenetriamine copolymer, such as Delsette 101® available from Hercules Incorporated; polyamine resins, such as Cypro 515®, available from Cytec Industries; polyquaternary amine resins, such as Kymene 557H®, available from Hercules Incorporated; and polyvinylpyrrolidone/acrylic acid, such as Sokalan EG 310®, available from BASF.

Fabric softening agents are also suitable adjunct ingredients. Fabric softening agents may be present in the lipophilic cleaning fluid as an optional adjunct ingredient. Fabric softening agents may also be included as part of any textile treatment liquid, that is for example, as part of a finishing fluid applied during the final stages of the treatment process. The fabric softening agents or actives typically comprise a cationic moiety, more typically a quaternary ammonium salt, preferably selected from the group consisting of: N,N-dimethyl-N,N-di(tallowyloxyethyl)ammonium methylsulfate, N-methyl-N-hydroxyethyl-N,N-di (canoyloxyethyl)ammonium methylsulfate and mixtures thereof.

The adjunct may also be an antistatic agent. Any suitable well-known antistatic agents used in laundering and dry cleaning art are suitable for use in the apparatus, methods and compositions of the present invention. Especially suitable as antistatic agents are the subset of fabric softeners which are known to provide antistatic benefits. For example those fabric softeners which have a fatty acyl group which has an iodine value of above 20, such as N,N-di(tallowoyl-oxy-ethyl)-N,N-dimethyl ammonium methylsulfate. However, it is to be understood that the term antistatic agent is not to be limited to just this subset of fabric softeners and includes all antistatic agents.

Preferred insect and moth repellent agents useful in the present invention are perfume ingredients, such as citronellol, citronellal, citral, linalool, cedar extract, geranium oil, sandalwood oil, 2-(diethylphenoxy)ethanol, 1-dodecene, etc. Other examples of insect and/or moth repellents useful in the composition of the present invention are disclosed in U.S. Pat. Nos. 4,449,987; 4,693,890; 4,696, 676; 4,933,371; 5,030,660; 5,196,200; and in "Semio Activity of Flavor and Fragrance Molecules on Various Insect Species", B. D. Mookherjee et al., published in *Bioactive Volatile Compounds from Plants*, ASC Symposium Series 525, R. Teranishi, R. G. Buttery, and H. Sugisawa, 1993, pp. 35–48, all of said patents and publications being incorporated herein by reference.

Textile Treatment Liquid

The apparatus and methods of the present invention may include the use of one or more textile treatment fluids. As was noted above, these fluids are any liquid, aqueous or non-aqueous, suitable for cleaning, conditioning or sizing of fabrics. They may also optionally be present with the lipophilic fluid to in the lipophilic cleaning fluid, up to about 50% by weight of the lipophilic cleaning fluid. Adjunct ingredients, as described in detail hereinbefore, may optionally be present in any textile treatment fluids. Typical, textile treatment fluids include, but are not limited to, pre-treatment fluid, such as, an aqueous solution comprising a bleach, bleach activator and/or bleach catalyst, and surfactant; rinsing fluid, such as, a non-aqueous solution comprising a surfactant and heptacosafluorotributylamine; and finishing fluid, such as, an aqueous solution of a surfactant, a perfume, an antistatic agent, a fabric softener, and a finishing polymer.

One especially preferred textile treatment fluid is the finishing fluid. For example a suitable finishing fluid would be an aqueous solution comprising one or more fabric softeners, one or more antistatic agents, and perfume. One such illustrative finishing fluid compositions is a mix of DPGDME (DiPropyleneGlycol DiMethylEther) N,N-di (tallowoyl-oxy-ethyl)-N,N-dimethyl ammonium chloride and a perfume.

Having thus described the invention in detail, it will be apparent to those skilled in the art that various changes may be made without departing from the scope of the invention and the invention is not to be considered limited to what is described in the specification.

What is claimed is:

1. An apparatus for treating fabric articles comprising:
 a fabric article treatment chamber wherein a fabric article to be treated is contacted with a fabric treating liquor which comprises a cleaning fluid, a composition or both;
 a first container for providing the cleaning fluid which comprises a lipophilic fluid;
 a second container for providing a fabric treating composition which comprises an adjunct ingredient; and
 a metering device associated with the first and second sources and the chamber;
wherein the first and/or the second containers are removably attached to the apparatus and the metering device is configured to control amount of the cleaning fluid and of the fabric treating composition in the fabric treating liquor.

2. The apparatus of claim 1 wherein the metering device comprises a manifold valve and conduits connecting the metering device to the first and second containers.

3. The apparatus of claim 1 wherein the cleaning fluid and the fabric treating composition are combined with fabric article in the treatment chamber.

4. The apparatus of claim 1 wherein the cleaning fluid and the fabric treating composition are combined prior to entering the treatment chamber.

5. The apparatus of claim 1 wherein the lipophilic fluid comprises at least about 50 wt % of the fabric treating liquor in the treatment chamber.

6. The apparatus of claim 1 wherein the lipophilic fluid is selected from the group consisting of linear or cyclic organosilicones, fluorinated solvents, C6 or higher diols, and mixtures thereof.

7. The apparatus of claim 1 wherein the fabric treating composition is a detergent composition or a finishing composition.

8. The apparatus of claim 1 wherein the adjunct ingredient comprises less than about 15 wt % of the fabric treating liquor in the treatment chamber.

9. The apparatus of claim 1 wherein the first or the second container is a refillable or replaceable container.

10. The apparatus of claim 1 further comprising a source for water which is detachably associated with the metering device, the treatment chamber, or both.

11. The apparatus of claim 10 wherein the fabric treating liquor comprises lipophilic fluid, water or mixtures thereof.

12. The apparatus of claim 10 wherein the metering device is configured to control amount of the lipophilic fluid, the fabric treating composition and water in the fabric treating liquor.

13. The apparatus of claim 1 further comprising a mechanical element configured to retain an amount of cleaning fluid up to absorptive capacity of the fabric article in the treatment chamber.

14. The apparatus of claim 13 wherein the mechanical element is a motor or a centrifugal extractor.

15. The apparatus of claim 1 further comprising a recovery system for separating components of the fabric treating liquor.

16. The apparatus of claim 15 wherein the recovery system is removably attached to the apparatus and is replaceable.

17. The apparatus of claim 15 wherein the recovery system is self-cleaning.

18. The apparatus of claim 1 further comprising an air circulation system, which comprises a heater, a blower, and optionally, an air duct operatively associated with the heater and the blower.

19. The apparatus of claim 1 further comprising one or more sensors for monitoring temperature of heated air, or mixtures of air, lipophilic fluid vapor and/or ozone.

20. The apparatus of claim 1 further comprising an applicator for delivering the fabric treating liquor into the treatment chamber such that the fabric article is contacted by the fabric treating liquor.

21. A method for treating fabric articles comprising the steps of:

(a) placing a fabric article in the treatment chamber of the apparatus according to claim 1; and (b) dispensing a fabric treating liquor into the treatment chamber such that the fabric article is contacted by dispensed fabric treating liquor.

22. The method of claim 21 further comprising the step of removing at least one of the containers from the apparatus and replacing it with a new container having the same or different content as the one being replaced.

23. The method of claim 21 further comprising the step of refilling at least one of the containers with the same or different content from the prior content in the container.

* * * * *